US006473165B1

(12) United States Patent
Coombs et al.

(10) Patent No.: US 6,473,165 B1
(45) Date of Patent: Oct. 29, 2002

(54) AUTOMATED VERIFICATION SYSTEMS AND METHODS FOR USE WITH OPTICAL INTERFERENCE DEVICES

(75) Inventors: Paul G. Coombs; Donald M. Friedrich, both of Santa Rosa, CA (US); Ken D. Cardell, Tucson, AZ (US); Curtis R. Hruska; Charles T. Markantes, both of Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 09/489,453

(22) Filed: Jan. 21, 2000

(51) Int. Cl.[7] ................................................ G06K 9/74
(52) U.S. Cl. ....................................................... 356/71
(58) Field of Search .......................... 356/21, 429, 445, 356/448, 364, 369, 365, 370, 366, 367; 250/221, 222.1, 225, 559.09, 559.04, 559.44, 550; 359/580, 585, 586, 589

(56) References Cited

U.S. PATENT DOCUMENTS

| | | | | | |
|---|---|---|---|---|---|
| 3,753,617 | A | * | 8/1973 | Ehrat | 356/71 |
| 4,183,665 | A | | 1/1980 | Iannadrea et al. | 356/71 |
| 4,204,765 | A | | 5/1980 | Iannadrea et al. | 356/71 |
| 4,592,090 | A | | 5/1986 | Curl et al. | 382/7 |
| 4,710,627 | A | | 12/1987 | Baltes et al. | 250/339 |
| 4,881,268 | A | * | 11/1989 | Uchida et al. | 382/7 |
| 4,922,109 | A | * | 5/1990 | Bercovtz et al. | 250/556 |
| 4,930,866 | A | * | 6/1990 | Berning et al. | 350/320 |
| 5,034,616 | A | * | 7/1991 | Bercovitz | 250/556 |
| 5,135,812 | A | | 8/1992 | Phillips et al. | 428/403 |
| 5,279,403 | A | | 1/1994 | Harbaugh et al. | 194/207 |
| 5,295,196 | A | * | 3/1994 | Raterman et al. | 382/7 |
| 5,308,992 | A | | 5/1994 | Crane et al. | 250/556 |
| 5,417,316 | A | | 5/1995 | Harbaugh | 194/206 |
| 5,434,427 | A | | 7/1995 | Crane et al. | 250/556 |
| 5,483,363 | A | * | 1/1996 | Holmes et al. | 359/2 |
| 5,498,879 | A | | 3/1996 | De Man | 250/556 |
| 5,535,871 | A | | 7/1996 | Harbaugh | 194/206 |
| 5,545,885 | A | | 8/1996 | Jagielinski | 235/493 |
| 5,552,589 | A | | 9/1996 | Smith et al. | 235/449 |
| 5,568,251 | A | * | 10/1996 | Davies et al. | 356/71 |
| 5,576,825 | A | * | 11/1996 | Nakajima et al. | 356/71 |
| 5,616,911 | A | | 4/1997 | Jagielinski | 235/493 |

(List continued on next page.)

FOREIGN PATENT DOCUMENTS

| | | |
|---|---|---|
| DE | 29819954 | 3/1999 |
| EP | 198819 | 8/1988 |
| WO | WO 96/13801 | 5/1996 |
| WO | WO 98/12583 | 3/1998 |

OTHER PUBLICATIONS

Paul G. Coombs and Tom Markantes, "*Improved Verification Methods for OVI™ Security Ink*, " In Optical Security and Counterfeit Deterrence Techniques III; RudolfL. van Renesse, William A. Vliegenthart, Editors, Proceedings of SPIE vol. 3973 (2000).

(List continued on next page.)

*Primary Examiner*—Michael P. Stafira
(74) *Attorney, Agent, or Firm*—Workman Nydegger Seeley

(57) ABSTRACT

An automated verification system for authenticating an object having an optical security feature includes an optical system, a transport staging apparatus, and an analyzing device. The optical system includes one or more light sources that are capable of generating either narrowband or broadband light beams. The transport staging apparatus cooperates with the light sources and is configured to position the object such that one or more of the light beams strike a portion of the object where the security feature should be located. The analyzing device receives the light beams reflected or transmitted from the object and is adapted to analyze the optical characteristics of the light beams at varying angles and/or wavelengths to verify the authenticity of the object.

23 Claims, 11 Drawing Sheets

U.S. PATENT DOCUMENTS

| | | | | | |
|---|---|---|---|---|---|
| 5,624,019 | A | | 4/1997 | Furneaux | 194/217 |
| 5,650,729 | A | | 7/1997 | Potter | 324/660 |
| 5,810,146 | A | | 9/1998 | Harbaugh | 194/206 |
| 5,816,619 | A | | 10/1998 | Schaede | 283/67 |
| 5,832,104 | A | * | 11/1998 | Graves et al. | 382/135 |
| 5,855,268 | A | | 1/1999 | Zoladz, Jr. | 194/207 |
| 5,889,883 | A | | 3/1999 | Simpkins | 382/135 |
| 5,892,239 | A | * | 4/1999 | Nagase | 250/556 |
| 5,903,340 | A | | 5/1999 | Lawandy et al. | 356/71 |
| 5,915,518 | A | | 6/1999 | Hopwood et al. | 194/207 |
| 5,918,960 | A | | 7/1999 | Hopwood et al. | 350/71 |
| 6,172,745 | B1 | * | 1/2001 | Voser et al. | 356/71 |

OTHER PUBLICATIONS

S.P. Fisher, R.W. Phillips, M. Nofi, R.G. Slusser, "*Characterization of Optically Variable Film Using Goniospectroscopy*," SPIE vol. 2262, pp. 107–115.

Money–Handling Equipment, "*Manual Counterfeit Detectors*," Internet site www.lynde–ordway.com/money/detect/manual, Jul. 20, 1999.

Money–Handling Equipment, "*Electronic Counterfeit Detectors*," Internet site www.lynde–ordway.com/money/detec/electrnc, Jul. 20, 1999.

BellCon I/S "*UV/White Light Conventional Money Tester*," Internet site www.bellcon.dk/page1.htm, Jul. 20, 1999.

Ardac Incorporated, "*AC or DC, Upstack or Downstack, 4–Way Acceptance*," Internet site www.ardac.com/dba.htm, Jul. 20, 1999.

TNO Institute of Appled Physics, "*Banknote Inspection*," Internet site www.tpd.tno.no/TPD/smartsite151.html, Jul. 20, 1999.

* cited by examiner

AUTOMATED VERIFICATION SYSTEMS AND METHODS FOR USE WITH OPTICAL INTERFERENCE DEVICES

BACKGROUND OF THE INVENTION

1. The Field of the Invention

The present invention relates generally to systems and methods for determining the authenticity of objects. More particularly, the present invention is related to systems and methods for automatically verifying the authenticity of an item by scanning for a security feature having predetermined spectral reflectance characteristics.

2. The Relevant Technology

In modem society, various conventional methods are utilized to trade goods and services. There are, however, various individuals or entities that wish to circumvent such methods by producing counterfeit goods or currency. In particular, counterfeiting of items such as monetary currency, banknotes, credit cards, and the like is a continual problem. The production of such items is constantly increasing and counterfeiters are becoming more sophisticated, particularly with the recent improvements in technologies such as color printing and copying. In light of this, individuals and business entities have a desire for improved ways to verify the authenticity of goods exchanged and/or currency received. Accordingly, the methods used to prevent counterfeiting through detection of counterfeit articles or objects must increase in sophistication.

Methods used to scan currency and other security items to verify their authenticity are described in U.S. Pat. Nos. 5,915,518 and 5,918,960 to Hopwood et al. The methods described in the Hopwood patents utilize ultraviolet (UV) electromagnetic radiation or light sources to detect counterfeit currency or objects. Generally, the tested object is illuminated by UV light and the resultant quantity of reflected UV light is measured by way of two or more photocells. The quantity of UV light reflected from the object is compared against the level of reflected UV light from a reference object. If the reflectance levels are congruent then the tested object is deemed authentic.

The methods in the Hopwood patents are based on the principle that genuine monetary notes are generally made from a specific formulation of unbleached paper, whereas counterfeit notes are generally made from bleached paper. Differentiation between bleached and unbleached paper can be made by viewing the paper under a source of UV radiation. The process of detection can be automated by placing the suspect documents on a scanning stage and utilizing optical detectors and a data analyzing device, with associated data processing circuitry, to measure and compare the detected levels of UV light reflected from the tested document.

Unfortunately, there are many problems with UV reflection and fluorescence detection systems, that result in inaccurate comparisons and invalidation of genuine banknotes. For example, if the suspect object or item has been washed, the object can pick up chemicals which fluoresce and may therefore appear to be counterfeit. As a result, each wrongly detected item must, therefore, be hand verified to prevent destruction of a genuine object.

Other conventional methods to detect counterfeit objects utilize magnetic detection of items which have been embossed or imprinted with magnetic inks, and/or image verification of images on the object. Unfortunately, magnetic inks are available to counterfeiters and can be easily applied to counterfeit objects, and image verification systems can be fooled by counterfeit currency made with color photocopiers or color printers, thereby reducing the effectiveness of these anti-counterfeiting approaches.

Other verification methods utilize the properties of magnetic detection to detect the electrical resistance of items which have been imprinted with certain transparent conductive compounds. These methods are, however, relatively complicated and require specialized equipment which is not easily available, maintainable, or convenient to operate, particularly for retail establishments or banks that wish to quickly verify the authenticity of an item.

Various items such as banknotes, currency, and credit cards have more recently been imprinted or embossed with optical interference devices such as optically variable inks or foils in order to prevent counterfeiting attempts. The optically variable inks and foils exhibit a color shift which varies with the viewing angle. While these optical interference devices have been effective in deterring counterfeiting, there is still a need for an accurate and convenient measuring system to verify that an item is imprinted with an authentic optical interference device.

With current advances in technology, new techniques are needed to battle a counterfeiter's ability to fabricate counterfeit objects. Accordingly, there is a need to provide authentication systems that extend the arsenal available to governments, business retailers, and banks to verify the authenticity of an item.

SUMMARY AND OBJECTS OF THE INVENTION

A primary object of the present invention is to provide systems and methods for authenticating an object which should have an optical interference device as a security feature.

Another object of the present invention is to provide systems and methods for detecting the spectral characteristics associated with an optical interference device such as a color shifting pigment, ink, or foil used for anti-counterfeiting purposes.

Yet another object of the present invention is to provide systems and methods which are capable of detecting the spectral shape or degree of spectral shift as a function of angle for items which have been imprinted or embossed with a color shifting security feature.

Still yet another object of the present invention is to provide systems and methods which are capable of detecting and analyzing the dispersion pattern of light reflected from an optical interference security feature.

A further object of the present invention is to provide a system for accurate determination of the authenticity of items which requires only minimal upgrades of existing verification scanning systems.

Still a further object of the present invention is to provide systems and methods which are capable of using various wavelengths of electromagnetic radiation to authenticate an optical interference security feature.

To achieve the forgoing objects and in accordance with the invention as embodied and broadly described herein, systems and methods are provided for automatically verifying the authenticity of an object by scanning for an optical interference security feature in the form of an optical interference device, such as a color shifting device having predetermined spectral reflectance or transmittance characteristics. Various objects such as currency, banknotes, credit cards, and other similar items imprinted or embossed with an optical interference device can thereby be authenticated.

A color shifting security feature exhibits both a characteristic reflectance spectrum and a spectral shift as a function of viewing angle, which can be utilized by the verification systems of the invention to determine the authenticity of an object. A verification system of the invention can be automated by placing the items to be verified on a transport stage which moves the items in a linear fashion for scanning.

The verification systems of the present invention generally include an optical system, a transport staging apparatus, and an analyzing device. The optical system includes one or more light sources that are capable of generating either narrow band or broadband light beams. Cooperating with the light sources is the transport staging apparatus, which is configured to position the object such that one or more of the light beams strike a portion of the object where a security feature should be located. The analyzing device receives the light beams reflected or transmitted from the object and the security feature, and is adapted to analyze the optical characteristics of the light beams reflected or transmitted by the object at varying angles and/or wavelengths to verify the authenticity of the object.

In one method for verifying the authenticity of an object according to the present invention, at least one light beam at a first incident angle is directed toward an object to be authenticated. The object is positioned such that the light beam is incident on a portion of the object where an optical interference security feature should be located. The light beam is directed from the object along one or more optical paths, such as by reflection or transmission, and one or more optical characteristics of the light beam are analyzed to verify the authenticity of the object. The optical characteristics can be analyzed by comparing the spectral difference between two light beams reflected or transmitted at different angles from the object against a reference spectral shift, or by comparing the spectral shape of at least one light beam reflected or transmitted from the object against a reference spectral shape.

These and other aspects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through use of the accompanying drawings in which.

DETAILED DESCRIPTION OF THE INVENTION

The present invention is directed to systems and methods for automatically verifying the authenticity of an object by scanning for an optical interference security feature having predetermined optical spectral characteristics, whether reflectance or transmissive characteristics. The invention is particularly useful in testing the authenticity of various objects such as banknotes, currency, credit cards, and the like which have been imprinted or embossed with an optical interference security feature such as a color shifting pigment, ink, foil, or bulk material, such as but not limited to plastic.

Recently developed color shifting pigments, inks, foils, and bulk materials used as security features have significantly reduced the ability to counterfeit goods, currency, banknotes, credit cards, and the like. Color shifting pigments, inks, foils, and bulk materials are formed from multi-layer thin film interference coatings that are very complicated to manufacture. As such, it is extremely difficult for counterfeiters to duplicate the effects of such color shifting security features. Additionally, in the case of banknotes and currency, the specific color shifting pigment or ink formulation is available only to legitimate manufacturers and specific governmental agencies, such as the U.S. Treasury. These color shifting pigments and inks exhibit a visual color shift which varies with the viewing angle. The amount of color shift is dependent on the materials used to form the layers of the coating and the thicknesses of each layer. Furthermore, at certain wavelengths the color shifting pigments and inks exhibit the property of higher reflectance with increased viewing angle.

Examples of specific compositions of such color shifting pigments or inks which can be utilized in a security feature are described in U.S. Pat. No. 5,135,812 to Phillips et al., the disclosure of which is incorporated by reference herein. Since the optical effects from the color shifting pigments or inks are repeatable and unique for each specific type of coating structure, the resulting color shift, reflectance, and/or transmittance of an authentic security feature can be measured and used as a standard or reference to test suspect security features placed on items or objects.

The systems and methods described herein allow for a simple and convenient verification of authenticity by scanning the optical characteristics, such as spectral reflectance or transmittance and/or the degree of spectral shift with angle using one or more light beams incident upon the security feature. The optical characteristics and/or spectral shift is compared with stored reference data to verify the authenticity of the security feature and hence the object.

Figure 1:
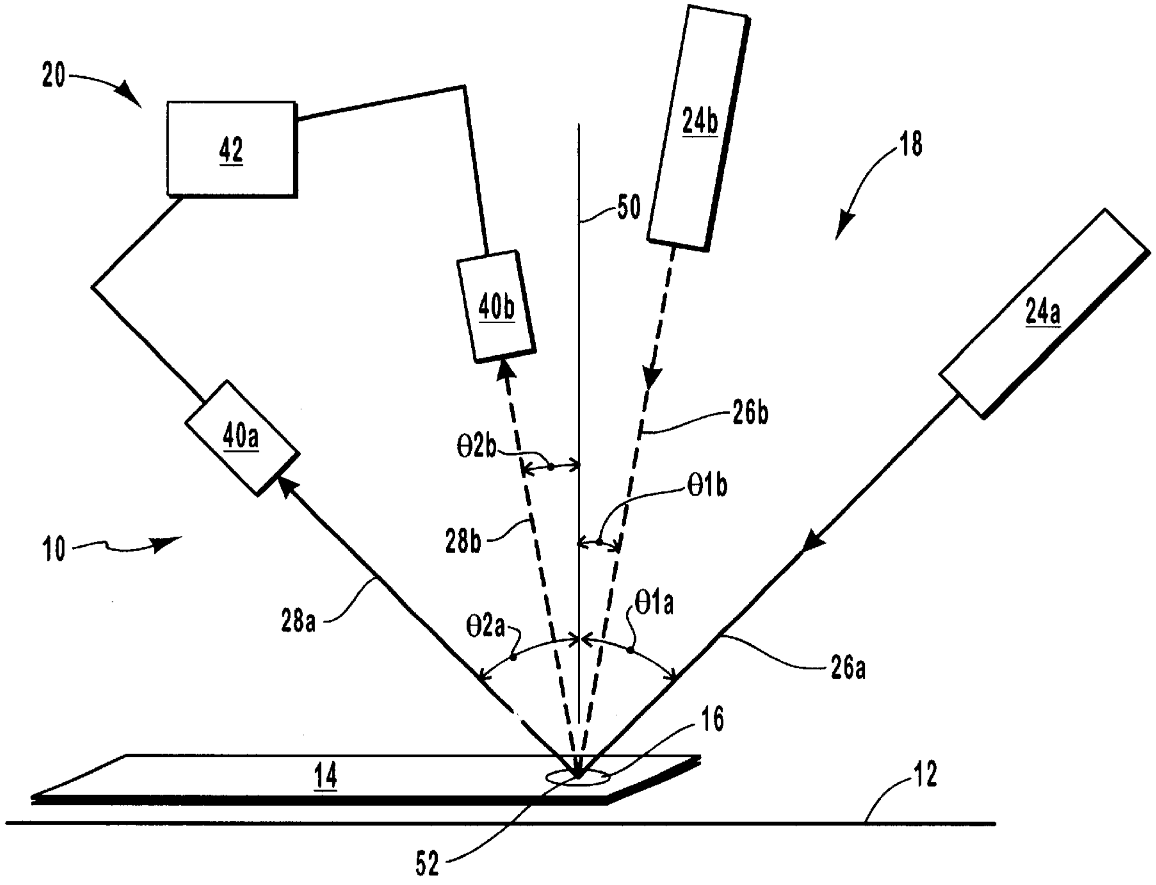
FIG. 1 is a schematic depiction of an automated verification system in accordance with one embodiment of the present invention.

Referring to the drawings, wherein like structures are provided with like reference designations, FIG. 1 is a schematic depiction of an automated verification system 10 in accordance with one embodiment of the present invention that can be utilized for validating the authenticity of an object that should include an optical interference security feature. The verification system 10 measures the spectral shape of the reflectance spectrum for an optical interference security feature 16 on an object 14 in or order to verify its authenticity. It can be appreciated, however, that verification system 10 may also use the spectral shape of the transmittance spectrum, whether alone or in combination with the reflectance spectrum to verify the authenticity of security feature 16.

The security feature 16 can take the form of various optical interference devices, such as optically variable inks, pigments, or foils including color shifting inks, pigments, or foils; bulk materials such as plastics; cholesteric liquid crystals; dichroic inks, pigments, or foils; interference mica inks or pigments; goniochromatic inks, pigments or foils; diffractive surfaces, holographic surfaces, or prismatic surfaces; or any other optical interference device which can be applied to the surface of an object for authentication purposes. Other suitable optical interference devices which combine diffractive or holographic surfaces with color shifting inks or foils are disclosed in a copending U.S. patent application, filed on Jan. 21, 2000 by Roger W. Phillips et al. and entitled "Optically Variable Security Devices", the disclosure of which is incorporated by reference herein. Additional suitable optical interference devices are disclosed in copending U.S. patent application Ser. No. 09/351,102, filed on Jul. 8, 1999 and entitled "Diffractive Surfaces with Color Shifting Backgrounds", the disclosure of which is incorporated by reference herein.

The object 14 on which security feature 16 is applied can be selected from a variety of items for which authentication is desirable, such as security documents, security labels, banknotes, monetary currency, negotiable notes, stock certificates, bonds such as bank or government bonds, commercial paper, credit cards, bank cards, financial transaction cards, passports and visas, immigration cards, license cards, identification cards and badges, commercial goods, product tags, merchandise packaging, certificates of authenticity, as well as various paper, plastic, or glass products, and the like.

The verification system 10, as depicted in FIG. 1, includes a transport staging apparatus 12 for carrying an object 14 to be authenticated, an optical system 18 for illuminating object 14, and an analyzing system 20 for analyzing the features of a reflectance spectrum. The verification system 10, therefore, is adapted to authenticate object 14 through analyzing the spectral shape of the reflectance spectrum for security feature 16. Generally, system 10 verifies the authenticity of security feature 16 by comparing the reflectance spectra of security feature 16 at two different reflection angles $\theta_{2a}$ and $\theta_{2b}$.

The verification system 10 includes an optical system 18 that has two or more light sources such as broadband light sources 24*a*, 24*b*. Broadband light sources 24*a*, 24*b* generate light in a range of wavelengths, such as from about 350 nm to about 1000 nm, to illuminate in a collimated fashion security feature 16 located on object 14. Suitable devices for light sources 24*a*, 24*b* include tungsten filaments, quartz halogen lamps, neon flash lamps, and broadband light emitting diodes (LED). It can be appreciated that system 10 may be modified to include only one light source 24, for example, including a mirror and a beam splitter or using bifurcated fibers fed from a common or single source.

The light sources 24*a*, 24*b* respectively generate a first beam 26*a* and a second beam 26*b* that are transmitted to an intersection point 52 at differing incident angles $\theta_{1a}$ and $\theta_{1b}$ with respect to a normal 50. Alternatively, first beam 26*a* and second beam 26*b* may be transmitted to different spots that do not intersect. Instead, beams 26*a*, 26*b* focus upon two separate spots that lie upon the longitudinal axis of transport staging apparatus 12 which object 14 passes along. In this configuration, beams 26*a*, 26*b* need not be activated and deactivated in sequence, but rather beams 26*a*, 26*b* may be continuously activated.

Figure 10:
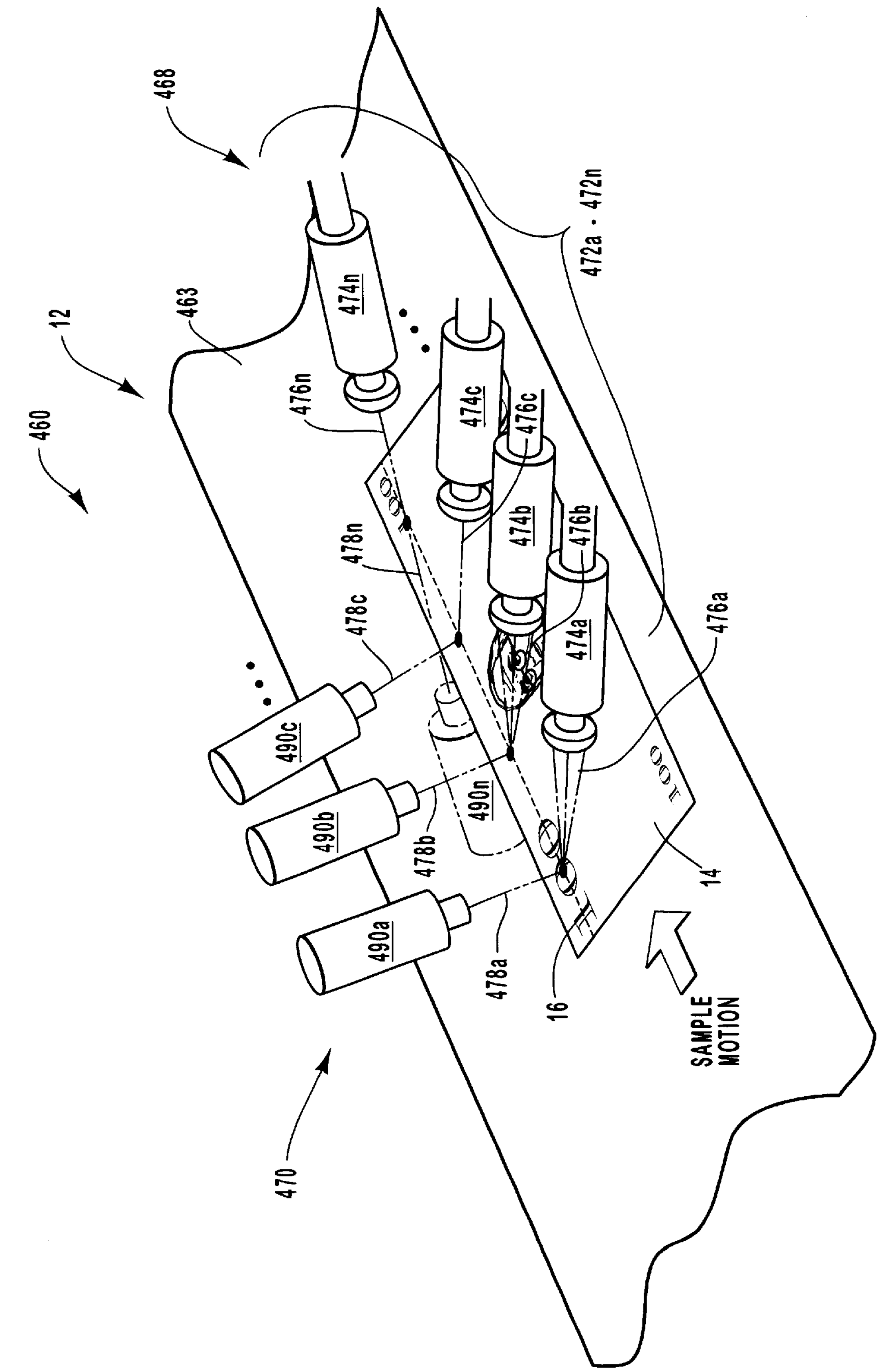
FIG. 10 is a schematic depiction of an automated verification system in accordance with an alternative embodiment of the present invention.

Light beams 26*a*, 26*b* are directed from security feature 16 along two different optical paths having angles $\theta_{2a}$ and $\theta_{2b}$, respectively, toward analyzing system 20, as defined by beams 28*a*, 28*b*. As depicted, beams 28*a*, 28*b* are reflected from security feature 16, however, it may be appreciated that the optical paths may include transmitted beams, as depicted in FIG. 10. Discussion will be made, with respect to reflectance angles, however, a similar discussion may be made with respect to transmittance angles. It can be appreciated, however, that operation of the present invention may be possible when $\theta_{1a}$ equals $\theta_{2a}$ and $\theta_{1b}$ equals $\theta_{2b}$. The particular values of incidence angles $\theta_{1a}$ and $\theta_{1b}$ of beams 26*a* and 26*b*, along with the resultant reflection angles $\theta_{2a}$ and $\theta_{2b}$ of light incident upon analyzing system 20 are important features of the present invention since the incident angles $\theta_{1a}$ and $\theta_{1b}$ directly effect the verification method. Accordingly, system 10 is configured such that incident angle $\theta_{1a}$ and reflection angle $\theta_{2a}$ are in a range from about 30° to about 80° from a normal 50, and preferably from about 40° to about 60°. The incident angle $\theta_{1b}$ and reflection angle $\theta_{2b}$ are in a range from about 0° to about 30° from normal 50, and preferably from about 5° to about 15°. It is preferable that $\theta_{1a}$ not equal $\theta_{2a}$, and that $\theta_{1b}$ not equal $\theta_{2b}$, or stated another way, measurement of reflected beams 28*a*, 28*b* should be performed at a different angular orientation relative to normal 50 than the incident angle of the incident light. By so doing, the gloss effects of light reflecting from the gloss surface of security feature 16 are mitigated.

The analyzing system 20 of the embodiment of FIG. 1, includes a first optical detector 40*a* and a second optical detector 40*b* which are operatively connected to a data analyzing device 42. The detectors 40*a*, 40*b* preferably have the form of spectrophotometers or spectrographs. The detectors 40*a*, 40*b* are used to measure the magnitude of the reflectance as a function of wavelength for the security feature being analyzed. Detectors 40*a*, 40*b* measure the reflectance from security feature 16 on object 14 over a range of wavelengths at two different angles and combine the reflectance data at each wavelength to generate a spectral curve for each reflection angle.

The detectors 40*a*, 40*b* may comprise, for example, a linear variable filter (LVF) mounted to a linear diode array or charge coupled device (CCD) array. The LVF is an example of a family of optical devices called spectrometers which separate and analyze the spectral components of light. The linear diode array is an example of a family of photodetectors that transduce a spatially varying dispersion beam of light into electrical signals that are commonly displayed as pixels. Together, the spectrometer and the photodetector comprise a spectral analyzing device called a spectrophotometer or spectrograph. It can be appreciated, therefore, that various other spectrometer and photodetector combinations and configurations may be used to obtain the desired reflectance data. For example, and not by limitation, in one configuration, detectors 40*a*, 40*b* are grating, prism, filter, or interferometer based spectrometers whose spectral output is scanned or detected photometrically by photometric array devices such as a linear diode array that may or may not be coupled to an image intensifier. In another configuration, detectors 40*a*, 40*b* use photographic film that is developed and coupled to a scanning microdensitometer. In yet another configuration, detectors 40*a*, 40*b* operate by scanning the optical spectrum across a slit mounted in front of a single photodetector, such as a photodiode or photomultiplier, in the manner of a traditional scanning spectrophotometer. Still yet another configuration of detectors 40*a*, 40*b* operate by scanning a photodetector mechanically or optically across the output face of a spectrometer or LVF. Yet another configuration of detectors 40*c*, 40*b* operate by scanning an interferometer's interference pattern across a photodetector followed by electronic transformation to a spectrum of the analyzed light. All of these combinations are known in the art as methods for converting a light into an electronically displayed graph called a spectrum and are collectively called spectrophotometers and spectrographs by those skilled in the art. The detector 40*a* is configured to receive light beam 28*a* reflected at a reflection angle $\theta_{2a}$ which is preferably close to incident angle $\theta_{1a}$, while detector 40*b* is configured to receive light beam 28*b* reflected at a reflection angle $\theta_{2b}$ which is preferably close to incident angle $\theta_{1b}$. As such, detectors 40*a*, 40*b* are each configured at a particular angular orientation which corresponds to the respective reflection angle of the light received by the detector. As shown in FIG. 1, detector 40*a* is at a greater angular orientation than detector 40*b*.

Communicating with detectors 40*a*, 40*b* is data analyzing device 42. Data analyzing device 42 electronically processes the data received from detectors 40*a*, 40*b* and compares the same with stored reference data to verify the authenticity of the security feature. The data includes electronic signals representative of the spectral shift of light reflected from the security feature at two different angles. Specifically, each detector 40*a*, 40*b* measures the reflectance over a range of wavelengths to generate a spectral curve for each light beam 28*a*, 28*b* reflected at angles $\theta_{2a}$ and $\theta_{2b}$, respectively. The data analyzing device 42 uses a microprocessor and additional circuitry to analyze the spectral curve generated by each detector 40*a*, 40*b* to verify the authenticity of security feature 16. For example, software is used to compare the spectral curves measured with reference spectra stored in a database of analyzing system 20. If the features of the measured spectra substantially coincide with the feature of reference spectra, then the item is deemed to be genuine. Therefore, data analyzing device 42 may indicate to a user whether the tested object is authentic or potentially counterfeit. As with detectors 40*a*, 40*b*, there are various types of data analyzing devices known to those skilled in the art that are capable of performing the desired function, such as application specific logic devices, microprocessors, or computers.

The security feature 16 of the embodiment depicted in FIG. 1 is generally formed from a high-precision optical interference device applied to object 14 as a pigment, ink, foil, or bulk encapsulant such as plastic. As the angle of incident light on security feature 16 is varied, the peak and trough wavelengths in a reflectance vs. wavelength profile changes. This provides a contrast between the low and high reflectance spectral features (i.e., peaks and troughs) produced by security feature 16, which is used by verification system 10 to determine the authenticity of security feature 16.

Physics dictates that the reflectance and transmittance spectra of optical interference devices shift toward shorter wavelengths with increasing viewing angle. In a method utilized in system 10 to verify the authenticity of object 14, a wavelength for each incident light beam 26*a*, 26*b* from light sources 24*a*, 24*b* is preselected which is near a peak or trough of the known reflectance vs. wavelength profile for security feature 16. For example, assuming angle $\theta_{2a}$ is greater than angle $\theta_{2b}$, if the wavelength of beams 26*a*, 26*b* from light sources 24*a*, 24*b* is near the value corresponding to a peak in the reflectance vs. wavelength profile (i.e., a reflectance maxima), then the ratio of reflectance at angle $\theta_{2a}$ to reflectance at angle $\theta_{2b}$ (i.e., the reflection ratio) will be less than one. Conversely, if the wavelength of beams 26*a*, 26*b* from light sources 24*a*, 24*b* is near a trough of the reflectance vs. wavelength profile (i.e., a reflectance minima), then the ratio of reflectance at angle $\theta_{2a}$ to reflectance at angle $\theta_{2b}$ will be greater than one. This latter case of selecting a wavelength near a trough of the reflectance vs. wavelength profile is advantageous in that most materials actually decrease in reflectance at increasing incident angles, whereas the color shifting pigments, inks, foils, and bulk encapsulants utilized for security imprinting have the unique property of increasing reflectance with increasing incident angles. As such, this latter case provides the advantage of making the verification more certain.

To be able to measure the change in reflectance with varying incident angles it may be desirable to interrupt beam 26*a* while allowing passage of beam 26*b* and vice versa. As such, each of the embodiments described herein is capable of operating either with continuous beams 26*a*, 26*b* or alternating beams 26*a*, 26*b* from different angular orientations. Therefore, one method of achieving alternating beams 26*a*, 26*b* is through interrupting power to one of light sources 24*a*, 24*b* or through the use of a barrier device, such as an optical chopper or electromechanical shutter. It can be appreciated that various other configurations of devices to interrupt beams 26*a*, 26*b* are known by one skilled in the art.

For color shifting pigments and inks such as those described in Phillips '812 that has been applied in a manner to give a low-gloss surface, it is preferred that incident angles $\theta_{1a}$ and $\theta_{1b}$ be each approximately equal to the respective reflection angles $\theta_{2a}$ and $\theta_{2b}$. It will be appreciated that reflection angles $\theta_{2a}$ and $\theta_{2b}$ need not equally correspond to the respective incident angles $\theta_{1a}$ and $\theta_{1b}$ as the angle of reflection can change depending on the type of optical interference security feature employed.

In operation of verification system 10, object 14 such as a banknote which has been affixed with security feature 16, is placed upon transport staging apparatus 12. The light sources 24*a*, 24*b* generate light beams 26*a*, 26*b* respectively that are directed to be incident upon intersection point 52 on the surface transport staging apparatus 12. The object 14 is moved in a linear fashion through intersection point 52, such that security feature 16 passes linearly through intersection point 52. Since object 14 moves past intersection point 52, verification system 10 has the ability to scan a line-shaped area of security feature 16 rather than a spot. The light beams 28*a*, 28*b* reflected from security feature 16 are incident upon detectors 40*a*, 40*b*, which simultaneously measure the reflectance at the two different reflection angles $\theta_{2a}$ and $\theta_{2b}$, respectively, yielding the reflectance spectrum at each angle. One technique to analyze such data is to pick one wavelength from the spectrum and compare the reflectance at the one wavelength measured at both angles $\theta_{2a}$ and $\theta_{2b}$ thus yielding the reflection ratio for that wavelength. The reflection ratio of the reflected light beams at reflection angles $\theta_{2a}$ and $\theta_{2b}$ is compared with the reference reflection ratio for a known authentic security feature to determine authenticity. For example, a genuine security feature might be configured to produce a higher reflectance at $\theta_{2a}$ than at $\theta_{2b}$, resulting in a predetermined reflection ratio, whereas a counterfeit would show either the same or lower reflectance at $\theta_{2a}$ compared to $\theta_{2b}$, resulting in a differing reflection ratio. It may be appreciated, that verification system 10 may operate in the transmittance mode rather than the reflectance mode to verify the authenticity of security feature 16.

According to another aspect of the presently depicted invention, verification system 10 includes transport staging apparatus 12. The transport staging apparatus 12 provides a means for positioning an object such that a beam of light is incident on a portion of the object where a security feature should be located. Numerous configurations for performing the desired transporting and positioning functions can be employed by transport staging apparatus 12. For example, transport staging apparatus 12 can include a belt or conveyor that carries and/or holds object 14 in the required orientation during the authentication process, moving object 14 in a linear fashion past optical system 18. Such a belt or conveyer may be deployed in either a high speed or low speed configuration to provide continuous verification of multiple objects, items or articles. In another configuration, transport staging apparatus 12 provides for stationary positioning of an object 14 in verification system 10. Various other structures may also function as a transporting and positioning means, and are known by those skilled in the art.

Conventional verification systems that measure a spot of a security feature are significantly less accurate than systems of the present invention since the measurement might be at a position on the item other than the security feature. This occurs because it is nearly impossible to guarantee that the ink or other material forming the security feature exists at a precise set of coordinates on the item being tested. In contrast, the verification systems of the present invention provide the ability to determine automatically the location of the security feature, thereby providing increased detection accuracy.

Figure 2:
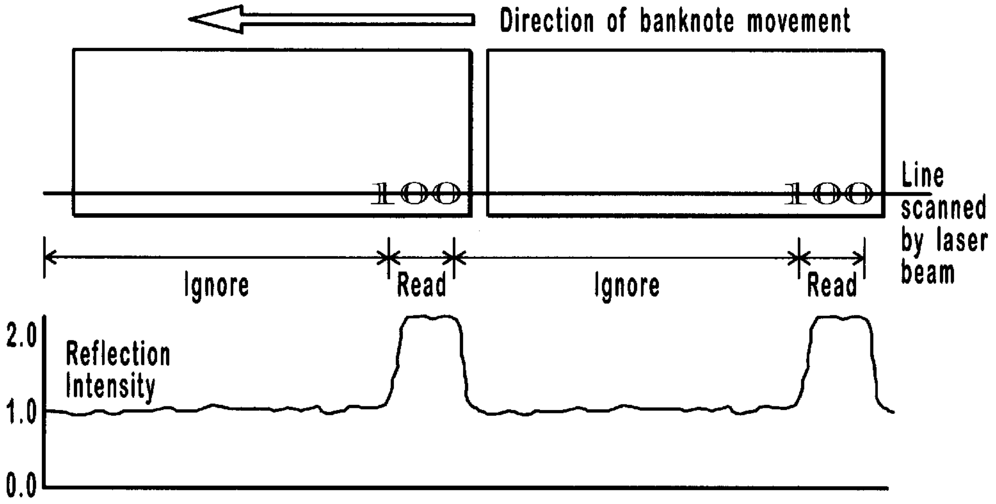
FIG. 2 is a graphical representation of the reflection intensity as a function of position on a banknote imprinted with an optical interference security feature.

FIG. 2 depicts schematically a typical plot of reflection intensity as a function of linear position on a scanned item such as a banknote imprinted with a security feature. Such a plot further represents a component of the reflection data detected by detectors 40*a*, 40*b* and data analyzing device 42 as the banknote passes through intersection point 52 in system 10. As shown in FIG. 2, a change in the reflection intensity, which is usually an increase, occurs at the location of the security feature on the banknote. If the features of the measured spectra substantially coincide with the features of the reference spectra, then the item is deemed to be genuine.

While the above description with respect to FIGS. 1 and 2 has focused on authentication of a document such as a banknote, it will be appreciated by those skilled in the art that the systems, methods, and apparatus of the present invention may be utilized in various other situations where verification of a security feature is desired such as, but not limited to, verification of credit cards, passports, commercial paper, goods, identification badges, product tags, or the like.

Figure 3:
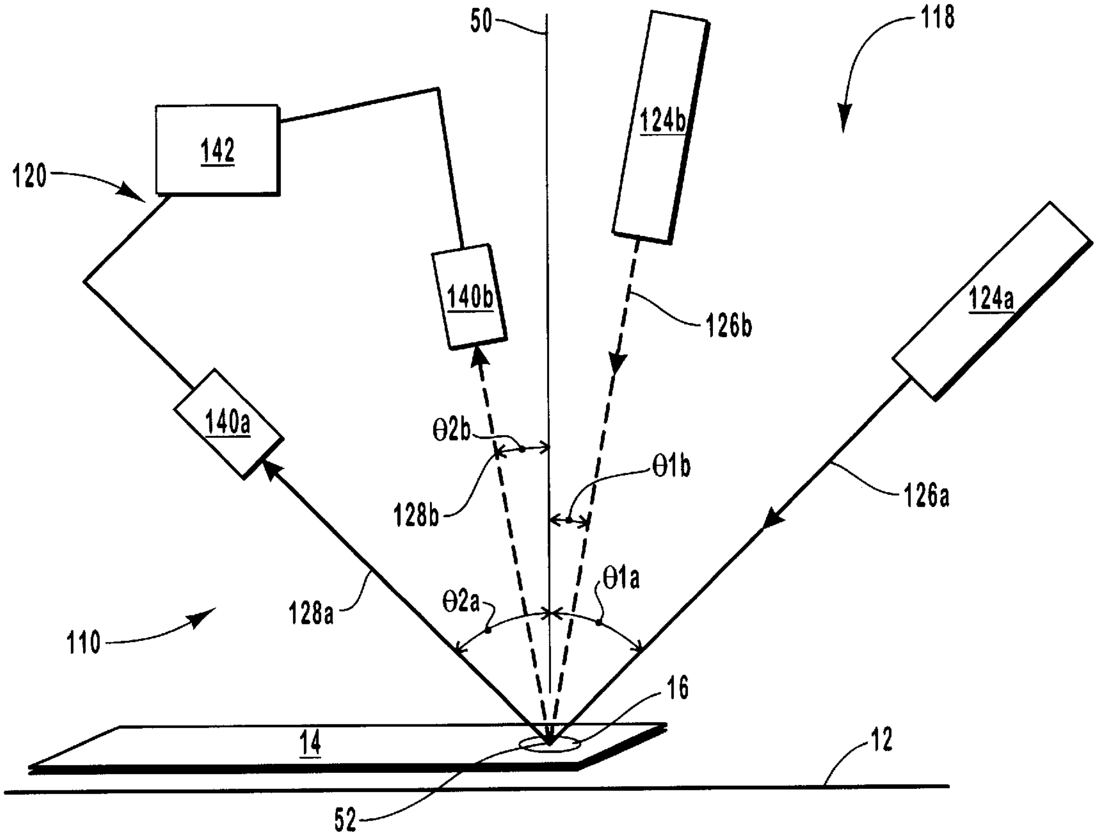
FIG. 3 is a schematic depiction of an automated verification system in accordance with an alternative embodiment of the present invention.

Referring to FIG. 3, an automated verification system 110 in accordance with another embodiment of the present invention is depicted. The verification system 110 includes some of the features described above with respect to system 10, including a transport staging apparatus 12 for carrying an object 14 to be authenticated. The verification system 110, however, is adapted to authenticate object 14 through analyzing the angle shift or color shift of a single wavelength band of electromagnetic radiation reflected from optical interference security feature 16.

Verification system 110 generally includes a transport staging apparatus 12 for carrying an object 14, an optical system 118, and an analyzing system 120. Optical system 118 includes two light sources; a first light source 124*a* and a second light source 124*b*, that are helium neon lasers or laser diodes, capable of generating monochromatic and collimated light beams 126*a*, 126*b*, respectively. The light sources 124*a*, 124*b* can take various other forms so long as they are capable of generating a monochromatic light beam. For example, light sources 124*a*, 124*b* can be monochromators or broadband sources taken through a narrow bandpass filter.

Analyzing system 120 includes a first optical detector 140*a* and a second optical detector 140*b* which are operatively connected to a data analyzing device 142. In contrast to detectors 40*a*, 40*b* of the embodiment represented in FIG. 1, detectors 140*a*, 140*b* may take the form of semiconductor photodiodes that are capable of detecting light reflected from security feature 16. Detectors 140*a*, 140*b* convert the reflectance characteristics of the reflected beams of light, beams 128*a*, 128*b*, from security feature 16 and transmit the data to data analyzing device 142. It will be appreciated by one skilled in the art that various other detectors are capable of performing the desired function, for example, spectrophotometers and spectrographs, such as, but not limited to photomultiplier tubes, CCD arrays, pyroelectric detectors, or photo-thermal detectors.

During operation of verification system 110, first beam 126*a* is generated by light source 124*a* which is incident upon object 14 at an incident angle $\theta_{1a}$ that is different than an incident angle $\theta_{1b}$ of a second beam 126*b* generated by light source 124*b*. The beam 126*a* is reflected toward a detector 140*a* along a first optical path at a reflection angle $\theta_{2a}$, depicted as beam 128*a*, while beam 126*b* is reflected toward a detector 40*b* along a second optical path at a reflection angle $\theta_{2b}$, depicted as beam 128*b*. As described previously, each verification system of the present invention may operate in a transmittance mode rather than a reflectance mode. Therefore, the first and/or second optical paths of beams 128*a*, 128*b* may be transmittance paths through object 14. The data analyzing device 142 operatively connects to detectors 140*a*, 140*b* and electronically processes the data related to spectral shift characteristics received from detectors 140*a*, 140*b* to verify the authenticity of a security feature 16 on object 14.

Figure 4:
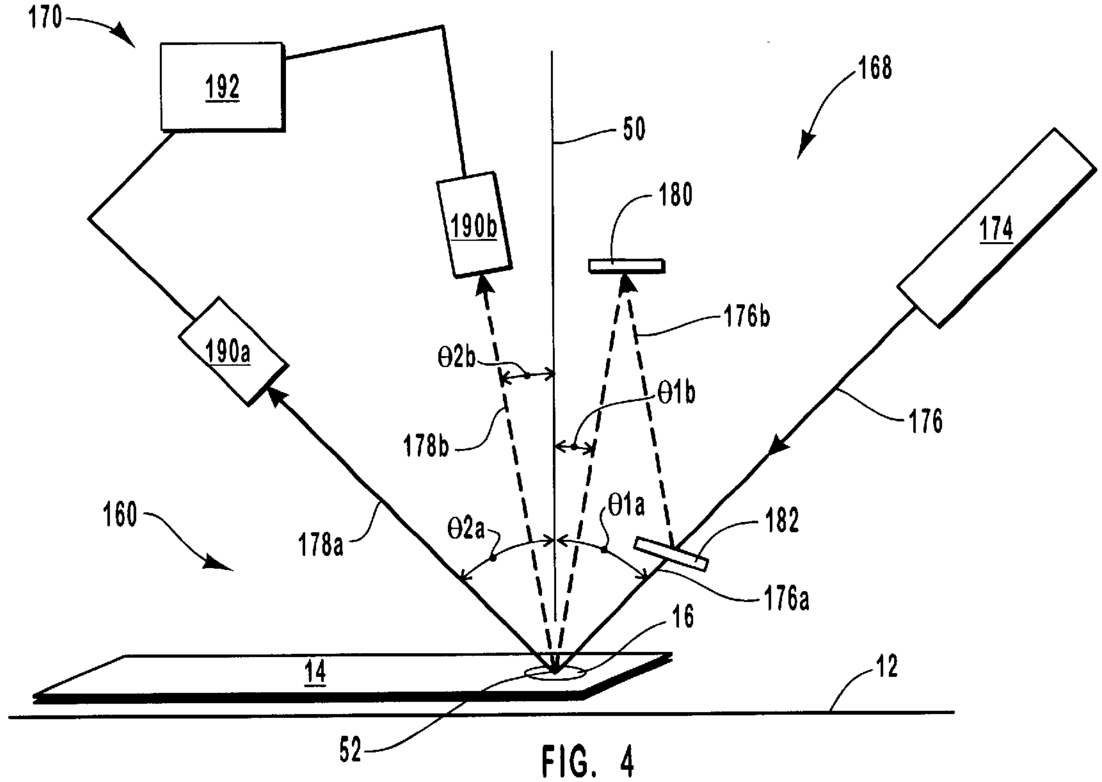
FIG. 4 is a schematic depiction of an automated verification system in accordance with another embodiment of the present invention.

Referring to FIG. 4, an alternate embodiment of the presently described invention of FIG. 3 is depicted. The majority of the features discussed with respect to verification system 110 also apply to automated verification system 160. The verification system 160 includes some of the features described above with respect to system 110, including a transport staging apparatus 12 for carrying an object 14 to be authenticated. The significant difference between verification system 160 and verification system 110 is optical system 168.

As depicted in FIG. 4, optical system 168 includes a single light source 174, such as a helium neon laser or a laser diode that is capable of generating a monochromatic and collimated light beam 176. The light source 174 can take other forms so long as it is capable of generating a monochromatic light beam. For example, light source 174 can be a monochromator or a broadband source taken through a narrow band pass optical filter.

In optical communication with light source 174 is a beam splitter 182, which separates light beam 176 into two beams, a first light beam 176*a* and a second light beam 176*b*. The first beam 176*a* is directed toward transport staging apparatus 12 at a first incident angle $\theta_{1a}$ relative to normal 50, while second beam 176*b* is reflected to a mirror 180 that reflects second beam 176*b* towards transport staging apparatus 12 at a second incident angle $\theta_{1b}$. The beam splitter 182 can split light beam 176 in various ways, such as, but not limited to, polarization components, bandwidths, intensities, or the like. As such, beam splitter 182 can be a polarizing beam splitter, a cubic beam splitter, partial reflector, or the like.

Further, it shall be appreciated that the combined function of beam splitter 182 and mirror 180 could alternatively be provided by a bifurcated fiber optic system that divides the incident light beam 176 and allows redirection of one or more intensity beams such as 176*a* and 176*b*.

The beam 176*b* is reflected from mirror 180 toward transport staging apparatus 12. Various mirrors 180 are appropriate for performing this desired function and are known by one skilled in the art. The mirror 180 is positioned in optical communication with transport staging apparatus 12 such that beam 176*b* is reflected from mirror 180 toward transport staging apparatus 12 at a second incident angle $\theta_{1b}$ different from the incident angle $\theta_{1a}$ of first beam 176*a*. Nevertheless, beam 176*b* reflected from mirror 180 falls upon security feature 16 on object 14 at substantially the same point as beam 176*a* at an intersection point 52 as shown in FIG. 4. Although beams 176*a*, 176*b* are shown meeting at intersection point 52, it may be appreciated that beams 176*a*, 176*b* need not meet, but may impinge upon transport staging apparatus 12 at different points upon the same longitudinal path that object 14 passes along transport staging apparatus 12.

The analyzing system 170 includes similar detectors and data analyzing devices as those previously discussed in verification system 110, to thereby authenticate security feature 16. Accordingly, analyzing system 170 includes a first optical detector 190*a* and a second optical detector 190*b* which are operatively connected to a data analyzing device 192. Detectors 190*a*, 190*b* convert the reflectance characteristics of the reflected beams of light, beams 178*a*, 178*b*, from security feature 16 and transmit the data to data analyzing device 192.

Figure 5:
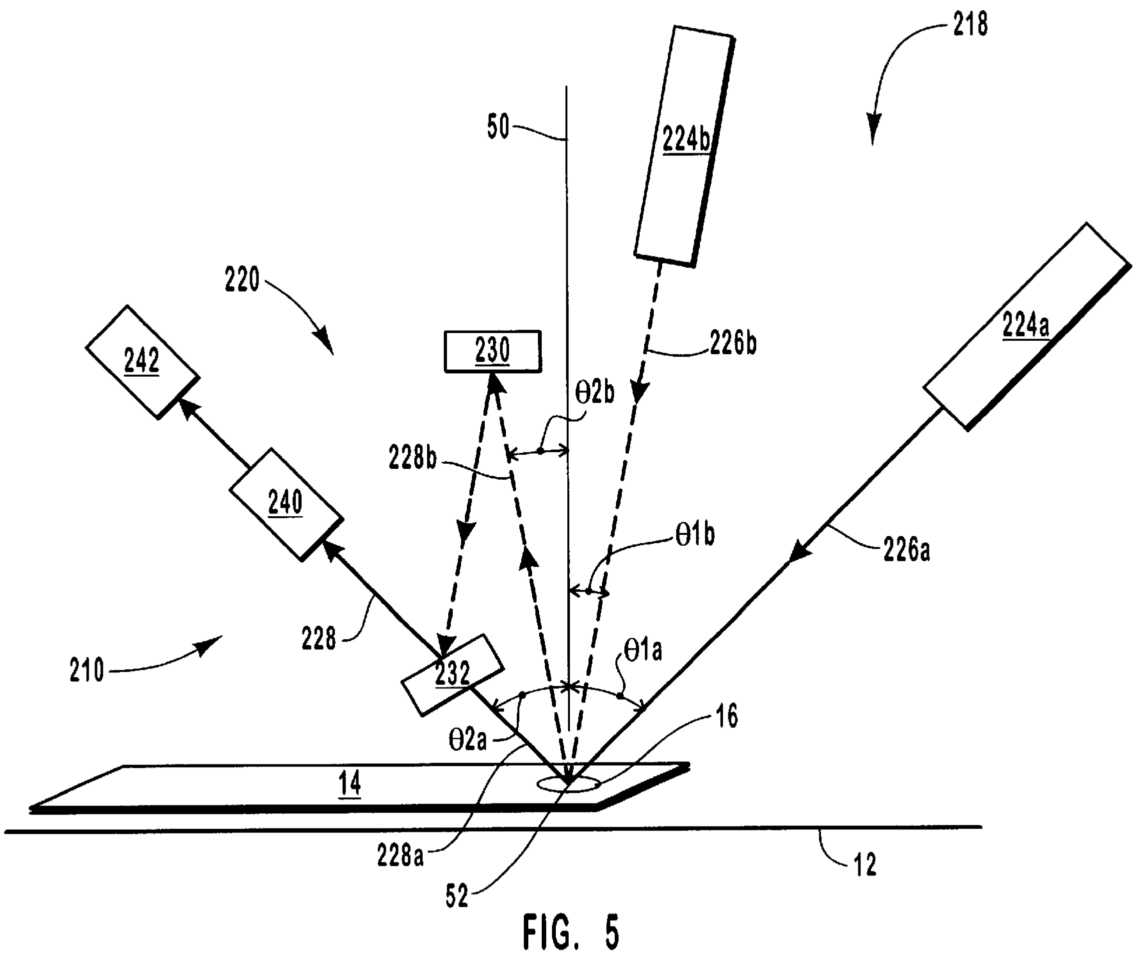
FIG. 5 is a schematic depiction of an automated verification system in accordance with another embodiment of the present invention.

Referring to FIG. 5, an alternate embodiment of an automated verification system 210 is depicted. The verification system 210 includes substantially all the features described above with respect to verification system 160, including a transport staging apparatus 12 for carrying object 14 to be authenticated. The significant differences between verification system 160 and verification system 210 is the specific configuration of optical system 218 and analyzing system 220. Analyzing system 220 is configured to receive the two or more reflected or transmitted beams 228*a*, 228*b* from object 14 and combine them into a single beam 228 that is utilized to verify the authenticity of object 14. Therefore, analyzing system 220 includes a mirror 230 and a beam splitter 232. As depicted, beam 228*b* is reflected from security feature 16 at angle $\theta_{2b}$ toward mirror 230. Various types of mirror 230 are possible and known by one skilled in the art. Beam 228*b* reflected from mirror 230 is incident upon beam splitter 232 that combines beam 228*b* and beam 228*a* reflected at $\theta_{2a}$ into a single beam 228. The beam splitter 232 can combine beams 228*a*, 228*b* in various ways, such as, but not limited to, according to the polarization components, bandwidths, intensities, or the like. As such, beam splitter 232 can be a polarizing beam splitter, a cubic beam splitter, a partial reflector, or the like. It may be appreciated that in another configuration the function of beam splitter 232 and mirror 230 could be provided by a bifurcated fiber optic system to combine the reflected beams 228*a*, 228*b*.

Figure 6:
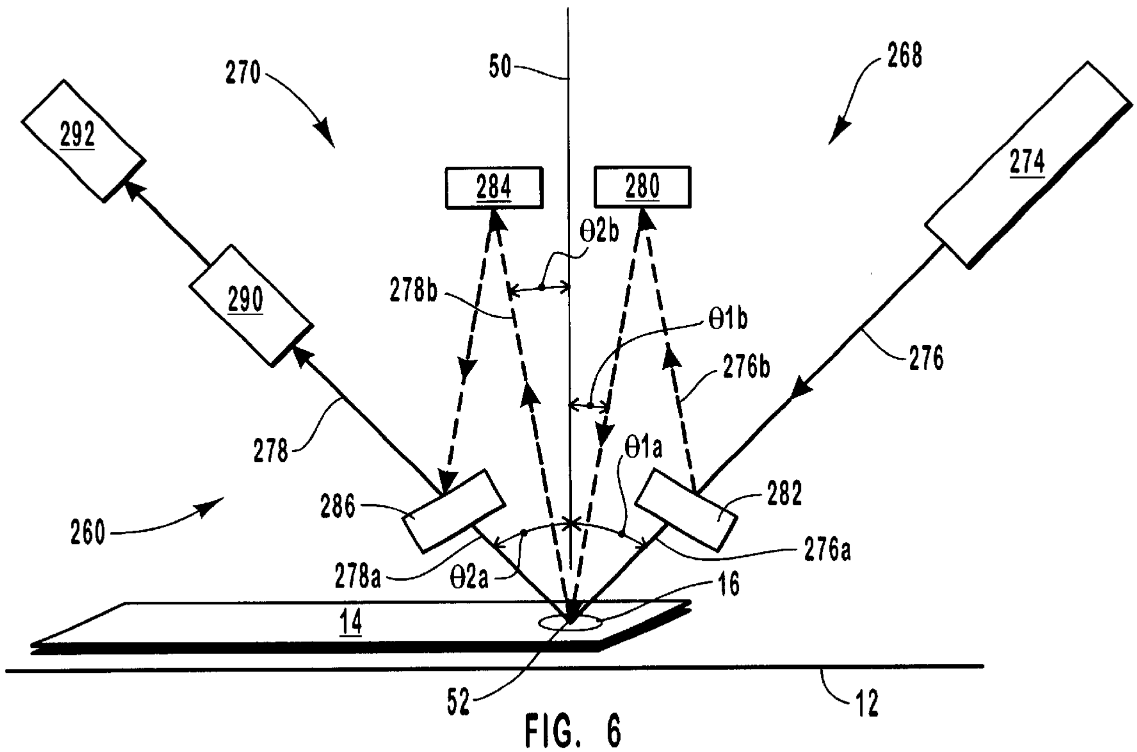
FIG. 6 is a schematic depiction of an automated verification system in accordance with an alternative embodiment of the present invention.

It is understood that the functions and structures of verification systems 160 and 210 may be combined into a single verification system 260, as depicted in FIG. 6. Verification system 260 includes a optical system 268 that uses a mirror 280 and a beam splitter 282 to split the beam 276 into two beams 276*a*, 276*b*. Additionally, verification system 260 includes an analyzing system 270 that also uses a mirror 284 and a beam splitter 286 to recombine reflected beams 278*a*, 278*b* into a single beam 278 that is directed towards detector 290 and data analyzing device 292.

Figure 7:
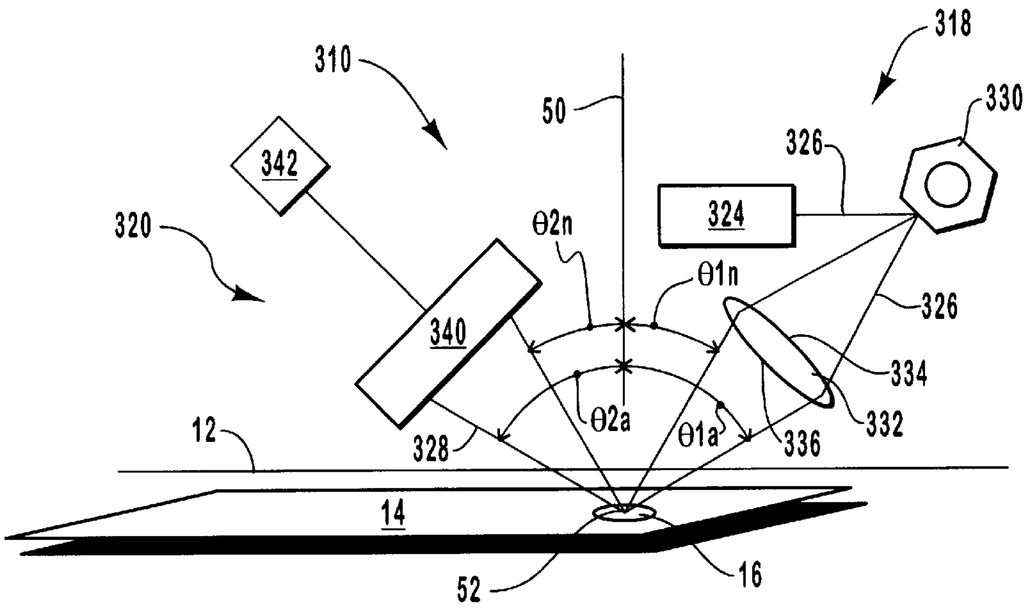
FIG. 7 is a schematic depiction of an automated verification system in accordance with a further embodiment of the present invention.

Depicted in FIG. 7 is another alternate embodiment of automated verification system 110. The majority of the features discussed with respect to verification system 110 also apply to verification system 310. The system 310 includes a transport staging apparatus 12 for carrying an object 14 to be authenticated. An optical system 318 generates a light beam 326 having a single wavelength or a small number of discrete wavelengths. An analyzing system 320 is provided for verifying the angular reflectance or transmittance of light beam 326 reflected or transmitted from a security feature 16 on object 14. This system replaces the collection of light from two or more light sources and achieves multiple incident angles with the use of an optical scanning device such as a rotating mirror as the only moving part.

As shown in FIG. 7, verification system 310 is adapted to verify the angular reflectance of light beam 326, however, one skilled in the art may modify the structure of verification system 310 to verify the angular transmittance. Optical system 318 includes a light source 324, such as a helium neon laser or a laser diode that is capable of generating a monochromatic and collimated light beam 326. As previously discussed, light source 324 may have various other forms so long as it is capable of performing the above defined function. In this embodiment, it is particularly important that light source 324 generates a very well collimated beam 326, because analyzing system 320 uses the angular reflectance rather than optical spectrum to determine authenticity of security feature 16. Another beneficial characteristic of using a highly collimated beam 326 is that beam 326 is very bright and has a high intensity.

Optically communicating with beam 326 is an optical scanning device in the form of a rotatable mirror 330, and a cylindrical lens 332. Rotatable mirror 330 has a generally polygonal shape such that rotation of mirror 330 varies the angular orientation of beam 326 leaving one of the mirror surfaces. Rotation of mirror 330 is controlled by a timing circuit (not shown) that allows complete control of the angle of incidence and reflection of beam 326 at any instant. It can be appreciated that various other optical scanning configurations can be used in place of rotatable mirror 330, such as a rotating or oscillating plane mirror, galvanometric optical scanner, electrooptical beam deflector, acoustooptical beam deflector, microelectromechanical system scanners (MEMS) such as a digital mirror display (DMD), or the like.

Light reflected from mirror 330 is incident upon cylindrical lens 332. Lens 332 has a generally cylindrical form having an input surface 334 and an exit surface 336. Beam 326 which is reflected from rotatable mirror 330 is transmitted by lens 332 to be incident upon security feature 16 of object 14 at varying incident angles $\theta_{1a}$–$\theta_{1n}$. It can be appreciated that one skilled in the art may identify various other configurations of lens 332 so along as the lens is capable of performing the desired function, i e., transmitting an incident beam of light 326 upon security feature 16.

Analyzing system 320 includes a detector 340 and data analyzing device 342. Detector 340 has the form of a single linear detector or photodiode array. Alternatively, a plurality of detectors may be utilized, as well as various other types of spectrophotometers and spectrographs known to those skilled in the art.

Detector 340 receives beam 328 which is reflected from security feature 16 at varying reflected angles $\theta_{2a}$–$\theta_{2n}$, due to the varying angles of incidence $\theta_{1a}$–$\theta_{1n}$ of beam 326. Detector 340 measures the intensity of the reflected light at given reflected angles 74 $_{2a}$–$\theta_{2n}$, and transmits the requisite data to data analyzing device 342. Data analyzing device 342 is operatively connected with the timing circuit (not shown) to control the rotation of mirror 330 such that the specific angle of incidence $\theta_{1a}$–$\theta_{1n}$ is known at any instant. By comparing the incident angle $\theta_{1a}$–$\theta_{1n}$ to the reflected angle $\theta_{2a}$–$\theta_{2n}$ and detected intensity, data analyzing device 342 may calculate the reflectance intensity as a function of incident angle. This is then used to verify the authenticity of object 14.

In operation, light source 324 generates beam 326 which is directed to mirror 330. Beam 326 is reflected from rotatable mirror 330 at varying angular orientations, for example ±30 degrees relative to a normal of the reflected surface of rotatable mirror 330. As such, beam 326 reflected from mirror 330 sweeps from +30 degrees to −30 degrees relative to the normal of a mirror surface as mirror 330 rotates. The sweeping beam of light is incident upon an input surface of cylindrical lens 332. Cylindrical lens 332 transmits each sweeping beam 326 to a specific spot on transportation stage system 16 where security feature 16 of object 14 is to pass. The angular orientation of beam 326 is continually varying and therefore the angle of incidence $\theta_{1a}$–$\theta_{1n}$ and angle of reflection $\theta_{2a}$–$\theta_{2n}$ of beams 328 and the optical path continually change. These changes in angle of reflection $\theta_{2a}$–$\theta_{2n}$ are detected and used to verify the authenticity of security feature 16. Specifically, since security feature 16 is an optical interference device, the reflected light varies with both angle and wavelength in a manner characteristic of the device and different from the counterfeit.

Various other configuration of the above described embodiment of the present invention are possible and known by one skilled in the art. For example, another configuration of verification system 310 includes multiple light sources that are capable of generating various monochromatic beams of light having differing wavelengths. As such, adjacent facets of polygonal mirror 330 reflect a different wavelength of light to allow reflectance to be measured at several different discrete wavelengths simultaneously. In another configuration, angle of incidence $\theta_{1a}$–$\theta_{1n}$ is close to or surrounds both sides of normal 50. As such, the plane of incidence must be separated from the direction of normal 50 to allow detection of the reflected light. To achieve this, analyzing system 320 is skewed relative to normal 50, therefore both cylindrical lens 332 and rotatable mirror 330 are skewed by an equal but opposite degree of tilt relative to the plane containing normal 50.

Figure 8:
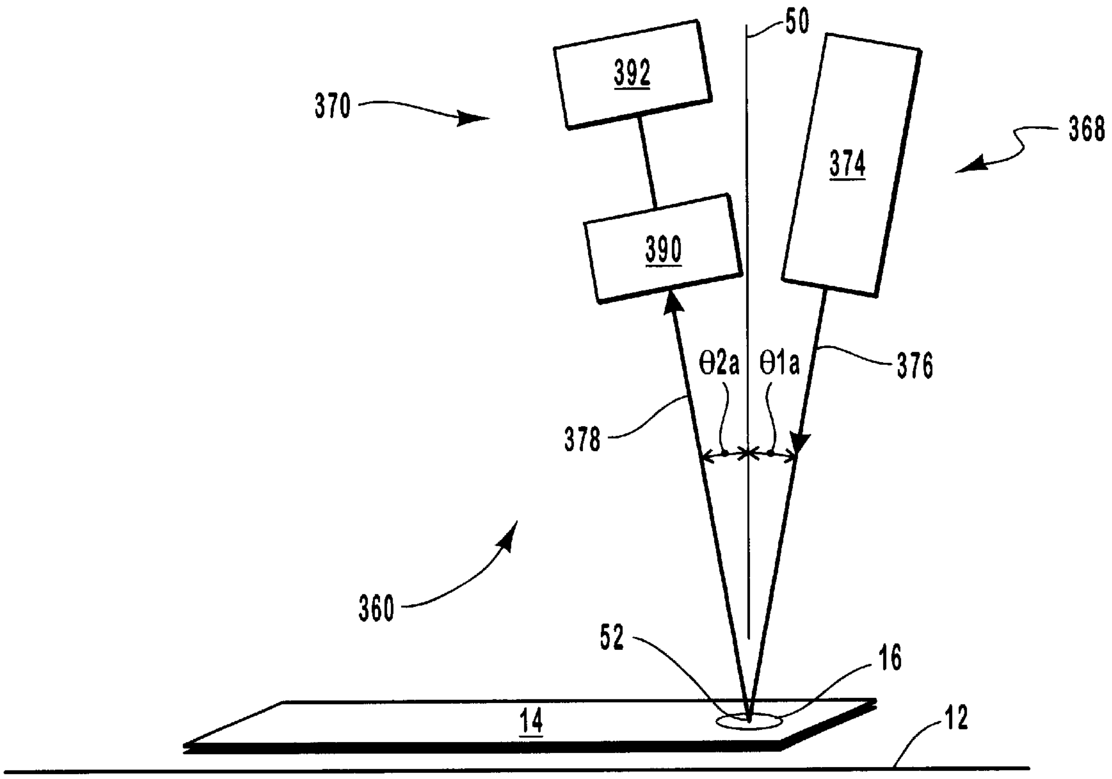
FIG. 8 is a schematic depiction of an automated verification system in accordance with an alternative embodiment of the present invention.

Referring to FIG. 8, an automated verification system 360 in accordance with another embodiment of the present invention is depicted. The verification system 360 includes some of the features described above with respect to system 10, including a transport staging apparatus 12 for carrying an object 14 to be authenticated. The verification system 360, however, is adapted to authenticate object 14 through analyzing the spectral 21 22 shape of the optical spectrum of light reflected from security feature 16 at a single reflectance angle.

Discussion herein will be directed to the various structures and functions associated with verification through use of reflectance spectrum, however, a similar discussion may be made with respect to the transmittance spectrum.

As discussed above, since security feature 16 is generally formed from a high-precision optical interference device, there is a great contrast between the high and low reflectance spectral features, i.e., peaks and troughs. Additionally, the spacing of the peaks and troughs, and their respective wavelengths, is predictable and repeatable, such that the spectral shape or profile of each security feature can serve as a "fingerprint" of the physical structure of the optical interference device. For example, in a five layer multi-layer thin film interference device such as described in Phillips '812 having the design metal$_1$-dielectric-metal$_2$-dielectric-metal$_1$ ($M_1DM_2DM_1$), the peaks (H) and troughs (L) have wavelengths that are related through the following mathematical formulae:

$\lambda_{L1} \cong$ Quarter Wave Optical Thickness $\quad \lambda_{H1} \cong \lambda_{L1}/2$ $\lambda_{L2} \cong \lambda_{L1}/3 \quad \lambda_{H2} \cong \lambda_{L1}/4$ $\lambda_{L3} \cong \lambda_{L1}/5 \quad \lambda_{H3} \cong \lambda_{L1}/6$ $\lambda_{L4} \cong \lambda_{L1}/7 \quad \lambda_{H4} \cong \lambda_{L1}/8$ $\lambda_{L5} \cong \lambda_{L1}/9$ By knowing the quarter wave optical thickness of the authentic security feature and the above ratios, it is possible to calculate the wavelengths of maximum reflectance ($\lambda_{max}$) and the wavelengths of minimum reflectance ($\lambda_{min}$) of the security feature (e.g., of the design $M_1DM_2DM_1$). Further, by measuring the reflectance (or transmittance) spectrum of the item to be tested, one can determine the measured values for $\lambda_{max}$ and $\lambda_{min}$. Then by comparing the measured values of $\lambda_{max}$ and $\lambda_{min}$ with the values predicted by the formulae, one can determine the authenticity of security feature 16 located on object 14.

In an alternate method, it is possible to scan the security feature and obtain the shape of its reflectance spectrum and/or its transmittance spectrum. The characteristic shape of the measured spectrum is then compared with the reference spectrum of a known authentic feature in order to determine the authenticity of the security feature.

Referring again to FIG. 8, verification system 360 has an optical system 368 which includes a broadband light source 374 that generates light in a range of wavelengths, such as from about 350 nm to about 1000 nm, to illuminate in a collimated fashion security feature 16 located on object 14. Suitable devices for light source 374 include various light generators such as but not limited to tungsten filaments, quartz halogen lamps, xenon flash lamps, and broadband light emitting diodes (LED).

A first beam 376 is generated by light source 374 which is incident upon object 14 at an incident angle $\theta_{1a}$. The light source 374 is configured such that incident angle $\theta_{1a}$ is in a range from about 0° to about 80° from a normal 50, and preferably from about 5° to about 60°.

The verification system 360 further includes an analyzing system 370 having a similar form to that of analyzing system 20. As such, analyzing system 370 includes a detector 390 and a data analyzing device 392. Detector 390 preferably has the form of a miniature spectrophotometer, however, detector 390 may also be a spectrograph, that are known by one skilled in the art. The detector 390 is used to measure the magnitude of the reflectance as a function of wavelength for the security feature being analyzed. The detector 390 is configured to receive a light beam 378 reflected at a reflection angle $\theta_{2a}$ which is preferably similar in magnitude to incident angle $\theta_{1a}$.

During operation of verification system 360, detector 390 measures the reflectance from security feature 16 on object 14 over a range of wavelengths and combines the reflectance data at each wavelength to generate a spectral curve. Data analyzing device 392 analyzes the spectral curve or shape generated by detector 390 to verify authenticity of security feature 16. Software is used to compare the spectral curve measured from the security feature of an item with a reference spectra stored in a database. If the features of the measured spectra substantially coincide with the features of reference spectra, then the tested item is indicated as genuine.

Another configuration for verification system 360 can utilize a high-precision spectrophotometer or spectrograph and a light source to gather the reflectance spectrum over a range of wavelengths. The reflectance spectrum would be analyzed and the resultant $\lambda_{max}$ and $\lambda_{min}$ calculated. The values for $\lambda_{max}$ and $\lambda_{min}$ are compared to the expected values in order to determine the authenticity of object 14 and security feature 16.

Figure 9:
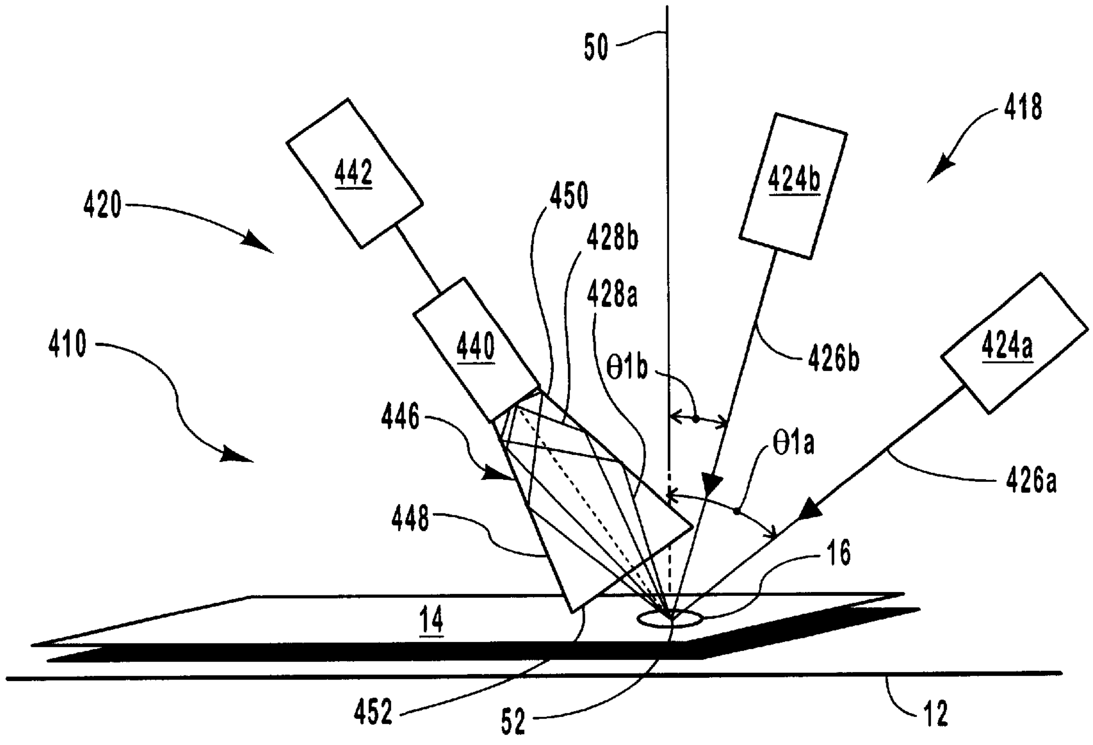
FIG. 9 is a schematic depiction of an automated verification system in accordance with another embodiment of the present invention.

Referring now to FIG. 9, another alternate embodiment of a verification system 410 is depicted. The majority of the feature described with reference to FIG. 1 also apply to verification system 410. For example, verification system 410 includes an optical system 418 which includes two light sources 424*a* and 424*b*. A unique feature of verification system 410 is the configuration of analyzing system 420.

Analyzing system 420 includes a detector 440, a data analyzing device 442, and a light collector 446. Light collector 446 has four trapezoidal shaped mirrors 448 arranged to form a hollow horn shaped light pipe. An upper end 450 of light collector 446 connects with detector 440, which preferably has the form of a miniature spectrophotometer or spectrograph in this particular embodiment. A lower end 452 of light collector 446 is open to receive light reflected from security feature 16 on object 14. In this configuration, beams 426*a* and 426*b* which are incident upon security feature 16 are reflected into cones of reflected light represented by lines 428*a*, 428*b*. The cones of light are incident upon and gathered by light collector 446 to be transmitted to detector 440.

It can be appreciated that one skilled in the art may identify various other configurations of light collector 446 that are capable of performing the function thereof. For example, in another configuration, light collector 446 is configured from a solid piece of optical material that is capable of transmitting and gathering the incident cones of light reflected from optical security feature 16.

The embodiment of FIG. 9 is capable of effectively operating with incident illumination of either a single wavelength or a broadband of wavelengths. For example, if light sources 424*a*, 424*b* are monochromatic in nature, then detector 440 may be a simple photodiode or the like. In the event that light sources 424*a*, 424*b* are broadband light sources, then detector 440 should be a spectrophotometer or spectrograph.

Although verification system 410 is shown to use reflectance data to verify the authenticity of object 14 and security feature 16, one skilled in the art may appreciate that verification system 410 may operate using a transmittance system.

Referring now to FIG. 10, another alternate embodiment of a verification system 460 is depicted. The majority of the feature described with reference to verification system 10 also apply to verification system 460. Verification system 460 includes a plurality of verification stations 472*a*–472*n* that are laid out longitudinally along the length of transport staging apparatus 12, and more specifically a track 463 thereof. Each station 472*a*–472*n* is made from a combination of a light source 474*a*–474*n* and a detector 490*a*–490*n* of analyzing system 470. Each verification station 472*a*–472*n*, therefore, generates a light beam 476*a*–476*n*, receives a reflected or transmitted light beam 478*a*–478*n*, and transmits data representative of the reflected or transmitted light beam 478*a*–478*n* to a data analyzing device.

The configuration of verification system 460 allows for a simple optical alignment of sources 474*a*–474*n* and detectors 490*a*–490*n*. Additionally, since each station 472*a*–472*n* is very simple, reliability may be added in redundancy, through adding more stations 472*a*–472*n* than are required to verify the authenticity of object 14. As such, if a few of stations 472*a*–472*n* stop functioning, verification system 460 may continue to operate while the failed stations are replaced. This is possible since accurate authenticity verification is possible with the remaining stations. In addition to allowing for redundancy, the speed of verification system 460 is only limited by the rate that object 14 passes under detectors 490*a*–490*n* and the rate of data processing.

As depicted, each light source 474*a*–474*n* generates a respective light beam 476*a*–476*n* having a narrow range of wavelengths of electromagnetic radiation. Each light beam 476*a*–476*n* may be incident upon security feature 16 of object 14 at different or similar angular orientations with respect to the angular orientation of the other light beams 476*a*–476*n*. Additionally, the wavelength of each light beam 476*a*–476*n* may be different or the same as subsequent or preceding light beams 476*a*–476*n*. For example, one light beam 476*a* may have a wavelength in the red region and be incident upon object 14 at a high angle, while another light beam 476*b* may have a wavelength in the blue region and be incident upon object 14 at a low angle.

One configuration for each of light sources 474*a*–474*n* is a light emitting diode (LED) coupled to the end of an optical fiber. Various other configurations of light sources 474*a*–474*n* are applicable and known to one skilled in the art.

Verification system 460 further includes an analyzing system 470 having a plurality of detectors 490*a*–490*n* positioned along a track 463. Each detector 490*a*–490*n* is located opposite to an associated light source 474*a*–474*n*, whether on the same side of object 14 or an opposing side of object 14 as depicted by light source 474*n* and detector 490*n*. Each detector 490*a*–490*n* receives a portion of light beams 476*a*–476*n* that is reflected from, or alternatively transmitted through, security feature 16. Each detector 490*a*–490*n* may take the form of any of the detectors discussed previously.

Figure 11:
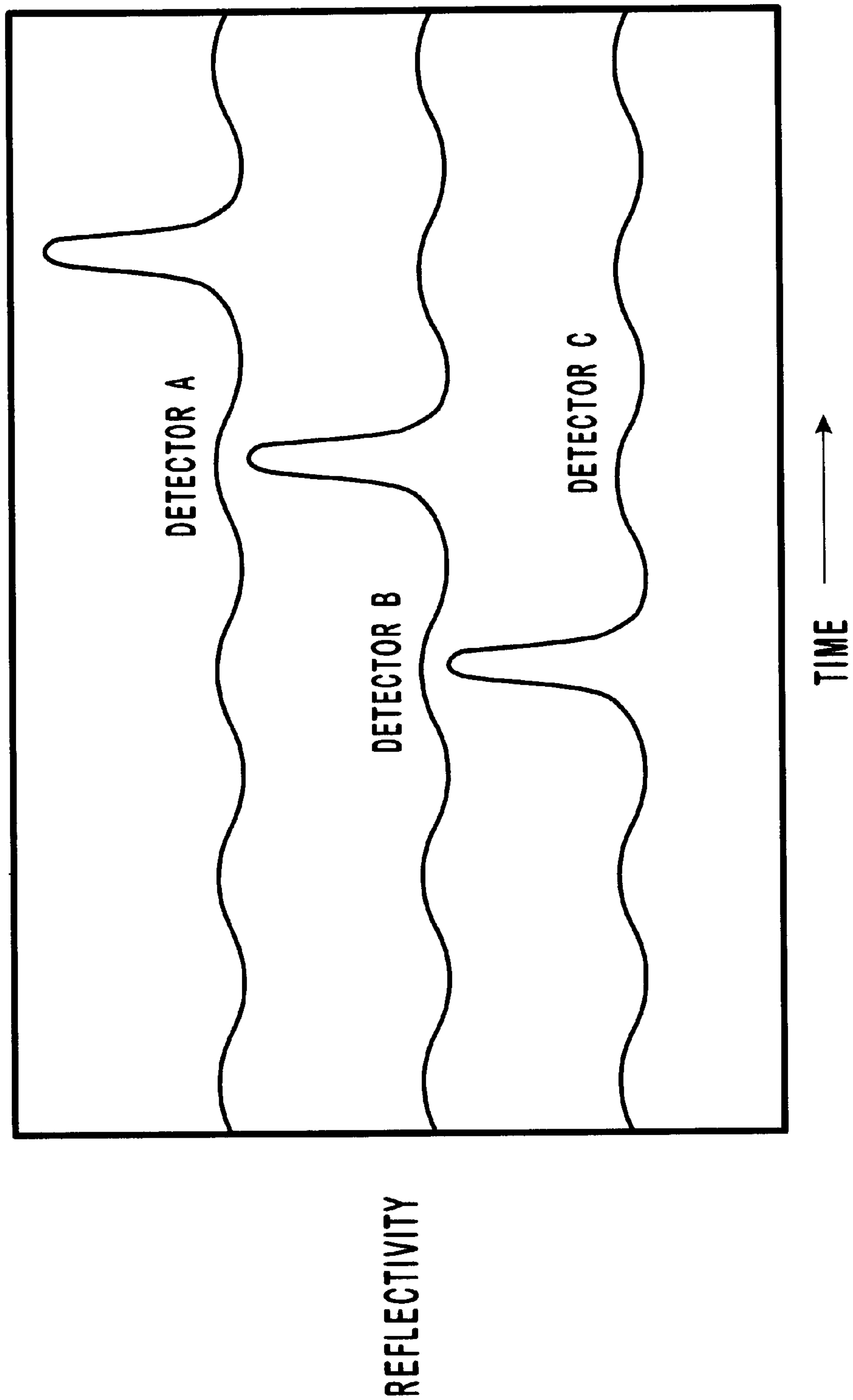
FIG. 11 is a graphical representation of various reflectivity intensities of various stations in the embodiment of FIG. 10.

The data analyzing device (not shown) of analyzing system 470 combines the information from each station 472*a*–472*n*, and specifically from each detector 490*a*–490*n*, based on the reflected (or transmitted) light, to identify specific spectral characteristics of security feature 16. FIG. 11 is a graphical representation of various reflectivity intensities measured by detectors 490*a*–490*c* as a function of time (labeled as detectors A, B and C in the graph). The data analyzing device compares the measured spectral characteristics with stored data of the authentic security feature to thereby verify the authenticity of security feature 16 and object 14. As such, the data analyzing device can take the same form as the data analyzing devices discussed previously.

In operation, object 14, for example currency, passes each station 472*a*–472*n*. The light beams 476*a*–476*n* are incident upon object 14 at various incident angles, such as two or more different angular orientations, such that the reflected (or transmitted) light is incident upon detectors 490*a*–490*n*. Detectors 490*a*–490*n* gather data representative of the reflectance (or transmittance) value at each station 472*a*–472*n*. Hence, a variety of reflectance and/or transmittance values are measured along the length of track 463. For instance, station 472*a* may have an 850 nm light source 474*a* and a detector 490*a* arranged at a high angle, thereby giving one reflectance value. The next station 472*b* may have another 850 nm light source 474*b* and a detector 490*b* that is mounted at a low angle that gives a different reflectance value. If the reflectance of security feature 16 measured at 850 nm varies with angle, the comparison of reflectance values between these two different stations 472*a*, 472*b* would indicate this difference in 850 nm reflectance.

Additionally, or alternatively, other stations 472*c*–472*n* may have light sources, with paired detectors, that emit other wavelengths of electromagnetic radiation such as at 540 nm (green). The stations 472*c*–472*n* can be established with light sources 474*c*–474*n* emitting a variety of different wavelengths, with light sources 474*c*–474*n* and detectors 490*c*–490*n* being arrayed at a variety of different angles. In this configuration, the data received from a number of stations 472*a*–472*n* may be added together until there are enough combinations of angles and wavelengths that the security feature 16 can be uniquely identified.

The operation of verification system 460 is time dependent, since the optical interference device forming security feature 16 to be analyzed is located at different stations 472*a*–472*n* at different times. Therefore, the signals from each of stations 472*a*–472*n* may be aligned and later compared. A number of different methods can be employed to re-align the time-dependent signals. One method of accomplishing this is by setting the speed at which object 14 passes by each station 472*a*–472*n*, and inserting a time delay on the signals generated by each station 472*a*–472*n* so that the signals reach the data analyzing device at essentially the same time, thereby allowing direct comparison of the signals.

Different configurations of detectors can be employed in verification system 460. As shown in FIG. 10, discrete detectors are configured along the line of sample motion. Alternatively, one or more linear detector arrays can be mounted at one or more angles along the direction of travel. In still another configuration, two-dimensional detector arrays may be used to provide the reflectance (or transmittance) values as a function of both angle and downstream position.

The structure and method described with respect to verification system 460 has the advantage of eliminating the need to switch light sources 474*a*–474*n* "on" and "off" to achieve different incident angles of light and different wavelengths of light.

Figure 12:
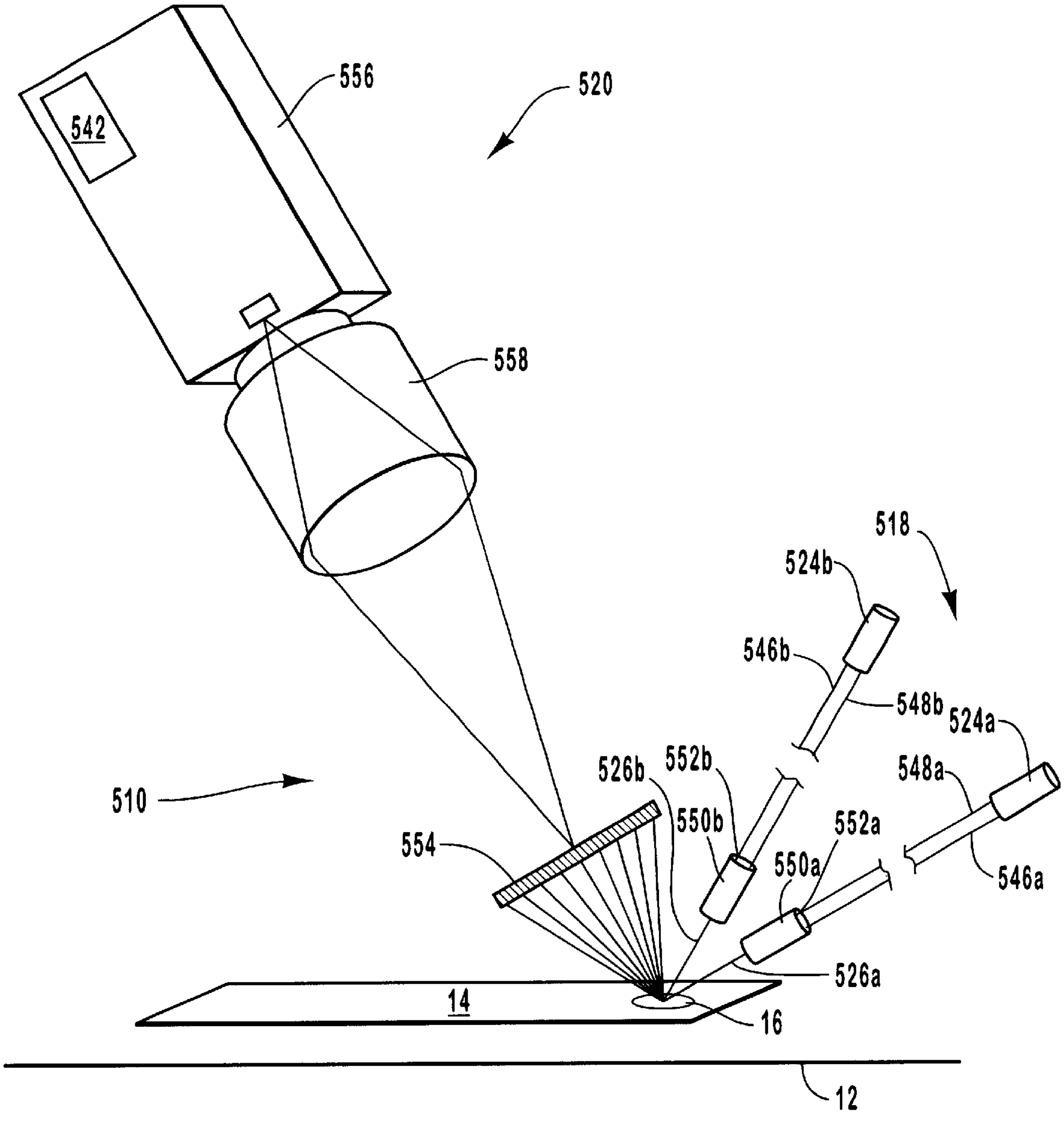
FIG. 12 is a schematic depiction of an automated verification system in accordance with another embodiment of the present invention.

Referring now to FIG. 12, another embodiment of a verification system 510 is depicted. The majority of the features described with reference to verification system 10 also apply to verification system 510. Verification system 510 has an optical system 518 and an analyzing system 520. Optical system 518 includes two collimated broad-band light sources 524*a*, 524*b* that generate two beams of light 526*a*, 526*b*. Each source 524*a*, 524*b* may include an optical fiber 546*a*, 546*b* having a broad-band light source 524*a*, 524*b* coupled at a first end 548*a*, 548*b*, while a collimating lens 550*a*, 550*b*, such as a GRIN lens, is coupled to a second end 552*a*, 552*b*. Numerous types of light sources 524*a*, 524*b* and collimating lenses 550*a*, 550*b* are known by one skilled in the art.

Optically communicating with light beams 526*a*, 526*b* is analyzing system 520. Analyzing system 520 includes a diffuser 554, and an image recording device such as a camera 556. Diffuser 554 is located in close proximity to object 14 and diffuses the reflected light from security feature 16. Reflected light from security feature 16 will spread out over a range of reflected angles with various wavelengths of electromagnetic radiation or colors selectively going in certain directions due to the characteristics of the optical interference device forming security feature 16. As such, diffuser 554 acts as a rear projection screen, that displays different colors across its surface to thereby form a color spectral pattern as the light back scatters off the surface thereof.

Additionally, diffuser 554 redirects light toward camera 556. Diffuser 554 is selected to balance the amount of light transmitted to camera 556 with respect to the light that is backscattered. A diffuser 554 that scatters relatively more light loses light with absorption, while a diffuser 554 that scatters very little light would allow the observable colors to pass straight through and not reach the camera lens 558.

Figure 13:
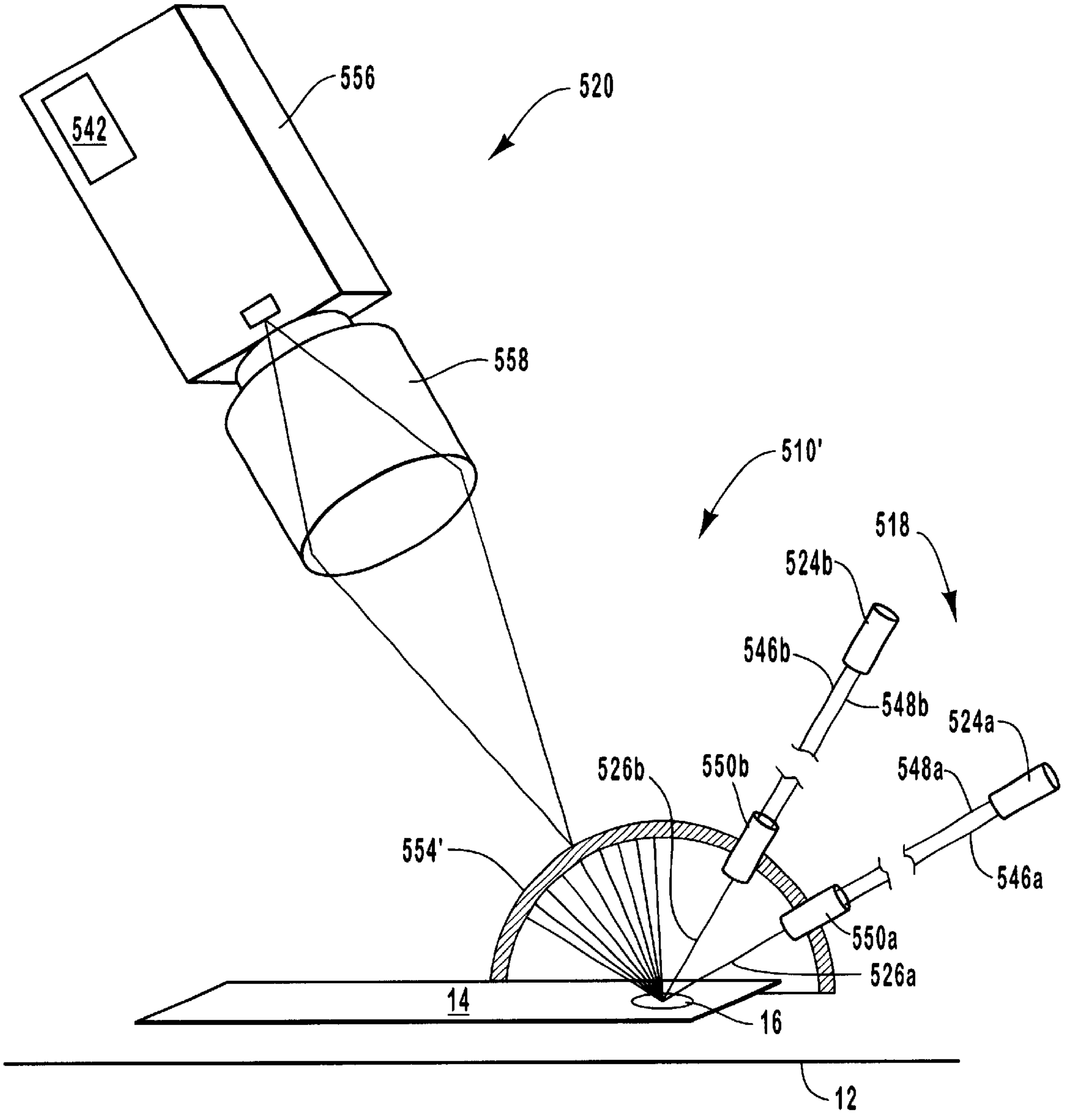
FIG. 13 is a schematic depiction of an alternate configuration of the embodiment of FIG. 12.

Diffuser 554 is preferably a planar ground glass diffuser, such as shown in the embodiment of FIG. 12. Various other types of diffusers are appropriate, however, such as by way of example and not limitation, a domed diffuser. Such a domed diffuser 554' is depicted in the alternate configuration of a verification system 510' illustrated in FIG. 13, which includes similar components as system 510. The domed diffuser 554' has the advantage of providing an even brightness across the surface thereof. The domed diffuser may have the form of a hemisphere, a complete sphere, any portion of a sphere, a portion of an ovular body, or the like. The term "domed" as used herein refers to various curved or curvilinear shapes that have a 3-dimensional or 2-dimensional structure.

Viewing the back scatter of light incident upon diffuser 554 is camera 556, having the form of a color camera, however, various other image recording devices are appropriate. For example, the color camera in analyzing system 520 could be replaced with an infrared camera, or a detector array such as a CCD, linear diode array, or two-dimensional diode array.

The camera 556 is focused on the surface of diffuser 554 to image the pattern of wavelengths or colors generated thereon. The wavelength channels imaged by camera 556 are transmitted to a data analyzing device 542, such as a computer, that has a stored wavelength and position pattern of an authentic security feature 16. Data analyzing device 542 processes the data received by camera 556, by way of recognition algorithms to determine if different wavelengths or colors are reflected in the same way as an authentic security feature 16. The determination may utilize either solely or in combination, the wavelength or color images, the pattern of the images, and the intensity of each color or wavelength. Additionally, since broad-band light sources 524*a*, 524*b* generate white spots the color pattern generated by diffuser 554, data analyzing device 542 may compare the location and number of white spots generated by a test object 14 with the number of white spots generated by an authentic object 14 and security feature 16.

Advantages of verification system 510 are that the hardware thereof is very easy to assemble, and tolerance errors are easily calibrated out by data analyzing device 542 through comparing the view image to a sample that reflects in an expected manner.

Figure 14:
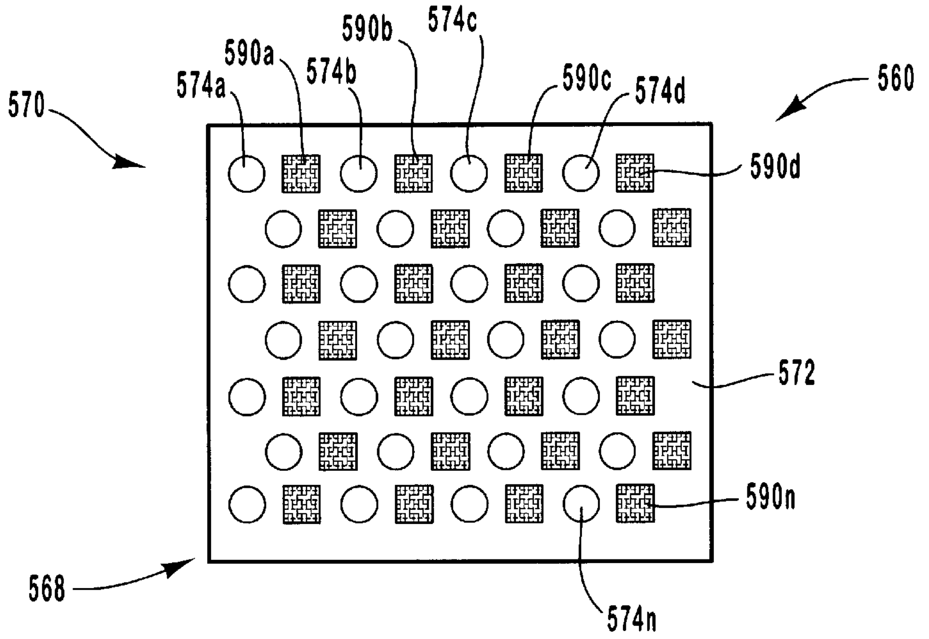
FIG. 14 is a schematic depiction of an automated verification system in accordance with an alternative embodiment of the present invention.

Referring now to FIG. 14, another alternate embodiment of a verification system 560 is depicted. The majority of the features described with reference to verification system 110 also apply to verification system 560. Verification system 560 includes an optical system 568 and an analyzing system 570, each of which are partially depicted. Optical system 568 includes a plurality of light sources 574*a*–574*n*, which can be broadband light sources (e.g., white light sources) or narrowband light sources producing discrete wavelengths of electromagnetic radiation (e.g., light emitting diodes) that are arranged in a two-dimensional (2-D) array 572. Similarly, a plurality of detectors 590*a*–590*n*, such as spectrophotometers and/or spectrographs, are arranged on the same array 572 at different locations while being in close proximity to light sources 574*a*–574*n*. The other portions of both optical system 568 and analyzing system 570 are similar to those previously described and to be further described herein.

In operation, 2-D array 572 is placed in position facing the object with the center of array 572 substantially, directly opposite the security feature 16. The array 572 is preferably planar, however various other configurations of array 572 are possible, such as by way of example and not limitation, hemispherical shape, dome shape, or the like. The array 572 is connected to a control system (not shown) that activates one or more of light sources 574*a*–574*n* and receives data from one or more of source 590*a*–590*n* at a given time.

Various methods of operating verification system 560 are discussed as follows. The discussion herein is provided for explanatory purposes and shall not be considered as excluding the applicability of the present invention from different modes of operation, different wavelengths of electromagnetic radiation, or different configurations of verification system 560.

In one example, light sources 574*a*–574*n* emit white light, while detectors 590*a*–590*n* give RGB (red, green, and blue) signal outputs to data analyzing device 592 that are proportional to the red, green, and blue intensities of the light reaching detectors 590*a*–590*n*. When, for example, one of light sources 574*a*–574*n* located substantially at the center of array 572 is turned on, detectors 590*a*–590*n* record the RGB signals as a function of position on array 572 (and hence angle from the sample). The signals from each detector 590*a*–590*n* are then integrated by data analyzing device 592 into a reflectance map which is characteristic of the sample. For example, object 14 incorporating an optical interference device such as optically variable pigment as described in Phillips '812 has a different reflectance map than that obtained from other types of pigment. In the example of security feature 16 being made using magenta-to-green optically variable pigment, turning on the center light source of light source 574*a*–574*n* in array 572 causes detectors 590*a*–590*n* adjacent to the activated light source 574*a*–574*n* to detect the near-normal reflected color of magenta. On the reflectance map created from the detector signals, each detector 590*a*–590*n* positioned radiating outward from one light source 574*a*–574*n* would detect colors progressing from magenta, through gold and finally to green at one of the detectors 590*a*–590*n* positioned around the perimeter of array 572 where the angle is furthest away from the surface normal. In this example, the data analyzing device 592 provides not only the color values from detectors 590*a*–590*n* but also the intensity measured by each detector.

In this example wherein security feature 16 is produced using flakes of optical interference pigment and those flakes are primarily aligned with the plane of object 14, the intensity of the detected signal tends to decrease radially from the position of the light source due to the fact that few flakes are positioned at high angles of tilt.

In the event that one of light sources 574*a*–574*n* at the perimeter is activated rather than one of light source 574*a*–574*n* at the center, the most intense signal will again be detected at those positions at which the angle of incidence is closest to the angle of reflection, but in this alternate example, this will not be for the detectors near the source. If the light used is the top, center position, then the greatest intensity will be achieved at the bottom center position. Given the same magenta-to-green optically variable pigment sample, the bottom center detector would detect a green color with high intensity given a detection angle of about 45 degrees while the detectors near the light source would see a magenta color with lower intensity. Therefore, by electrically switching different light sources 574*a*–574*n* in array 572, the detector array would obtain intensity and color signals which produce a sequence of maps which are both individually and collectively characteristic of the specific optical interference device being interrogated.

It should be appreciated that other combinations of light sources 574*a*–574*n* and detector types could be used in array 572. For example, the white light sources could be replaced with light emitting diodes (LEDs) that emit a narrower range of wavelengths (or selectable wavelengths). If these LEDs are mounted alongside broadband detectors (such as silicon-based detectors), then one would obtain a series of maps giving intensity data as a function of wavelength, light source position, and detector position. By switching "on" and "off" different LEDs, one would obtain a series of maps which again would be characteristic of the optical interference device of security feature 16. This configuration is advantageous in that the detectors and LED light sources are less expensive to utilize.

Figure 15:
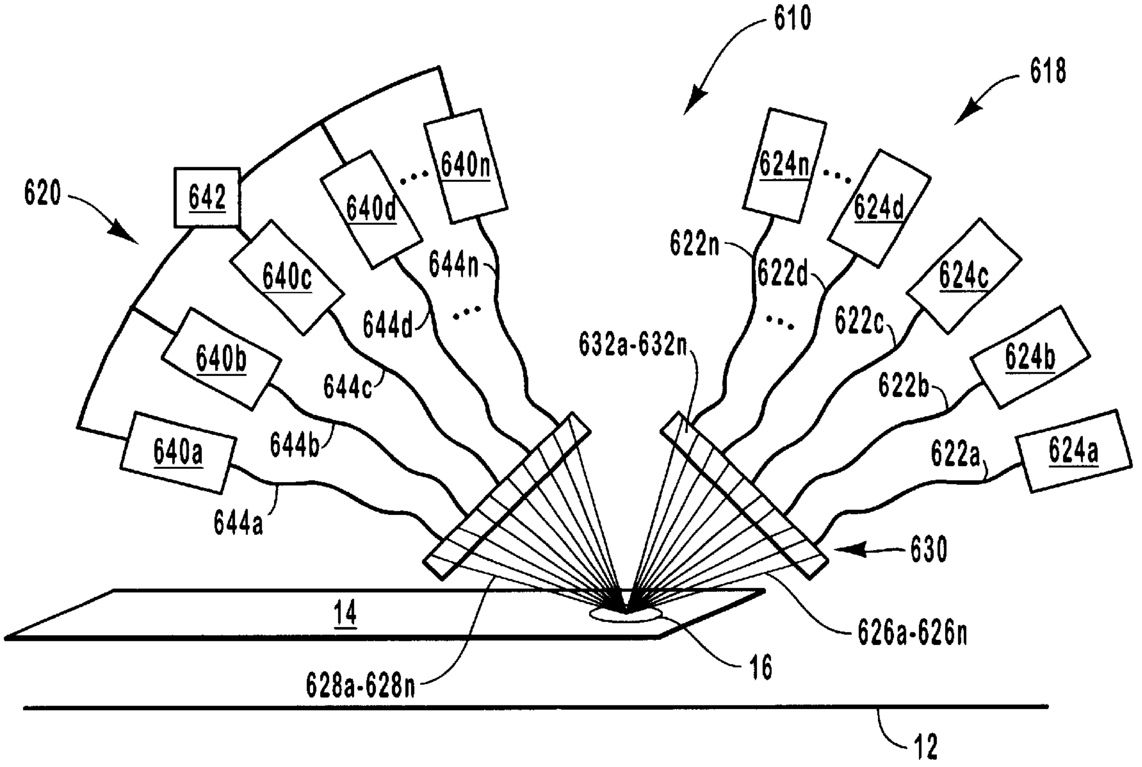
FIG. 15 is a schematic depiction of an automated verification system in accordance with a further embodiment of the present invention.

Referring now to FIG. 15, another embodiment of a verification system 610 is depicted. The majority of the features described with reference to verification system 10 also apply to verification system 610. Verification system 610 includes an optical system 618 and an analyzing system 620. Verification system 610 allows numerous beams of light to be incident upon object 14 and security feature 16 at varying angles, while analyzing system 620 receives the reflected or transmitted light at different discrete angles, thereby allowing a determination of authenticity of security feature 16 of object 14.

As depicted in FIG. 15, verification system 610 is configured to utilize the reflectance characteristics to verify the authenticity of object 14 by security feature 16, although one skilled in the art may identify various other configurations that utilize transmittance characteristics either solely or in combination with the reflectance characteristics to verify the authenticity of object 14. Optical system 618 has a plurality of light sources 624*a*–624*n* each coupled to a plurality of light transmitting optical fibers 622*a*–622*n*. Each light source 624*a*–624*n* coupled to optical fibers 622*a*–622*n* either generates a discrete wavelength of electromagnetic radiation, such as a monochromatic beam generated by a laser or LED, or alternatively a broadband of electromagnetic radiation, such as from a white light source. The ends of optical fibers 622*a*–622*n* distal from light sources 624*a*–624*n* are attached together to form an optical fiber bundle 630, thereby allowing light sources 624*a*–624*n* to be small, robust, and durable, while providing for easier installation and use. The arrangement of the ends of optical fibers 622*a*–622*n* must be performed carefully to limit the effect of coupling of light at high cone angles during operation of verification system 610.

One or more of the distal ends of optical fibers 622*a*–622*n* may include a focusing or narrowing lens 632*a*–632*n*, such as a GRIN lens or a micro-ball lens, to reduce the cone angle of the light exiting from optical fibers 622*a*–622*n*, from a typical cone angle of about 35 degrees corresponding to a numerical aperture of 0.3 to a cone angle of about 12 degrees corresponding to a numerical aperture of 0.1. As such, light exiting from the distal end of each optical fiber 622*a*–622*n* will be incident upon security feature 16 at varying angular orientations.

Optically communicating with a plurality of beams 628*a*–628*n* reflected from the surface of or transmitted through security feature 16 are one or more detectors 640*a*–640*n*. Each detector 640*a*–640*n* may take the form of a spectrophotometer or spectrograph, or a number of detectors having filters that allow passage of certain regions of the spectrum. Detectors 640*a*–640*n* are located in close proximity to security feature 16 to limit the effects of optical coupling at high angles from optical fibers 622*a*–622*n* on the periphery of optical bundle 630. Detectors 640*a*–640*n* collect the reflected light as each light source 624*a*–624*n* is turned "on" and "off" in a timed sequence. By so doing, detectors 640*a*–640*n* gather the intensities of reflected and/or transmitted light incident upon each detector 640*a*–640*n*, for varying angularly incident cones of light have various wavelengths or colors within the predetermined timed sequence. The reflectance (or transmittance) data is relayed to data analyzing device 642 that manipulates the data to determine the pattern of light intensities, wavelengths (or colors) and angles. The pattern is compared to the stored pattern characteristic of an authentic security feature to verify the authenticity of object 14.

As depicted in FIG. 15, detectors 640*a*–640*n* may be coupled to a plurality of light receiving optical fibers 644*a*–644*n*. As such, light reflected from or transmitted by security feature 16 travels towards at the distal ends of optical fibers 644*a*–644*n* along multiple optical paths. Light is transmitted along optical fibers 644*a*–644*n* to respective detectors 640*a*–640*n* for measurement and conversion to electronic signals which are sent on to data analyzing device 642 for manipulation.

Figure 16:
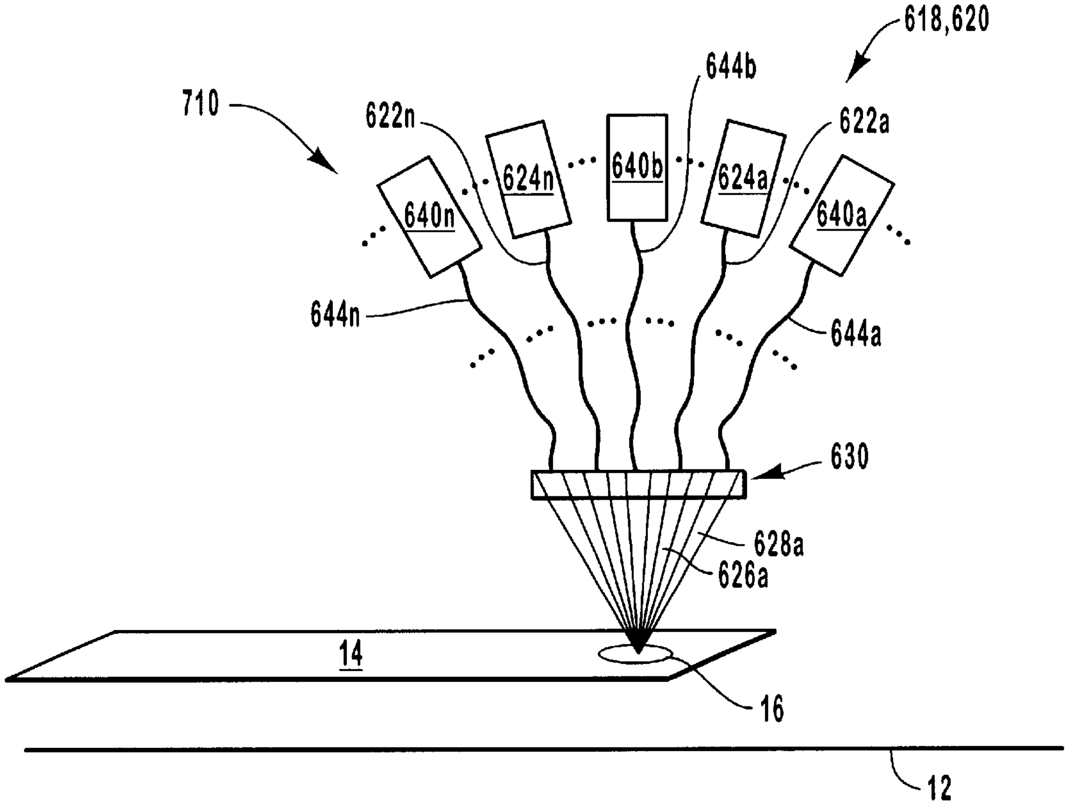
FIG. 16 is a schematic depiction of an alternate configuration of the embodiment of FIG. 15.

In an alternate configuration of a verification system 710 shown in FIG. 16, which has similar components as system 610, optical fibers 622*a*–622*n* are coupled with light sources 624*a*–624*n*, and optical fibers 644*a*–644*n* are coupled to detectors 640*a*–640*n*. The optical fibers are intertwined such that distal ends of optical fibers 622*a*–622*n* and 644*a*–644*n* can be bound together within the same optical fiber bundle 630. By so doing, only a single optical bundle 630 is placed in close proximity to object 14 and security feature 16, limiting the space required and reducing the complexity of verification system 710.

Generally, the present invention may be embodied in various structures that perform various functions, such as, but not limited to (i) means for directing a first light beam at a first incident angle and a second light beam at a second incident angle toward an object to be authenticated; (ii) means for positioning an object such that the first and second light beams are incident on a portion of the object where an optical interference security feature should be located; and (iii) means for analyzing one or more optical characteristics of the first light beam directed from the object along a first optical path and the second light beam directed from the object along a second optical path to verify the authenticity of the object.

For example, various structures capable of performing the function of directing light beams at different incident angles are described for the optical systems of the preceding embodiments of the present invention. Illustrative structures performing the light directing function include one or more narrowband or broadband light sources that generate one or more beams of light to be incident upon an object, such as shown in the embodiments of FIGS. 1, 3, 5, and 9. Another illustrative structure performing the light directing function is depicted in FIGS. 4 and 6, where one light source generates a single light beam that is split into two light beams by way of a beam splitter and a mirror. Yet another structure that is capable of performing the light directing function is depicted in FIG. 7, where a single light beam is incident upon a rotating mirror that reflects the light beam at varying incident angles toward an object. Other structures performing the light directing function are depicted in FIGS. 12–13 and 15–16, where multiple light sources are coupled to the ends of optical fibers. Still other structures that are capable of performing the light directing function are depicted in FIG. 10, where a number of light sources are positioned along a row, and in FIG. 14, where a number of light sources are spaced apart in an array.

Various structures capable of performing the function of positioning an object such that the light beams are incident on a portion of the object where an optical interference security feature should be located are described for the preceding embodiments of the invention. For example, the transport staging apparatus described for the above embodiments performs the function of positioning an object. As discussed above, numerous configurations for performing the desired transporting and positioning functions can be employed, such as a belt or conveyor that carries and/or holds an object in the required orientation, moving the object in a linear fashion past the optical system. In addition, a staging apparatus can provide for stationary positioning of an object in a verification system of the invention.

There are various structures capable of performing the function of analyzing one or more optical characteristics of the light beams directed from the object to verify the authenticity of an object. For example, the analyzing systems described for the preceding embodiments of the present invention perform the analyzing function. More specifically, these analyzing systems can include at least one spectrophotometer or spectrograph, and may include multiple detectors and detector arrays. The analyzing systems also include a data analyzing device which cooperates with one or more detectors to analyze the spectral shift or spectral curve of the light beams reflected or transmitted at various angles. It can be appreciated that there are various other structures that will perform the analyzing function which are known by those skilled in the art.

It should be understood that each of the preceding embodiments of the present invention may utilize a portion of another embodiment, and should not be considered as limiting the general principals discussed herein. For example, each of the embodiments, and other applicable adaptations and configurations may utilize the beneficial effects of analyzing transmitted rather than reflected light from security feature 16 and object 14. Furthermore, each of the light sources described herein may be comprised of a single or multiple source of narrowband and/or broadband light which is transmitted through the air or some other gaseous medium, through an optical waveguide such as an optical fiber, or through a vacuum. Additionally, each verification system may utilize a beam splitter and mirror configuration, or fiber optics, such that a light beam is split into two or more separate beams that are reflected and then received by multiple detectors or a single array detector, or recombined into a single beam received by a single detector. Finally, each light source may generate a continuous light beam or alternating light beam that is incident upon the security feature and object.

In addition, it should be understood that various embodiments discussed herein can be configured and miniaturized through existing technologies to operate as hand-held units, and thus would not require a transport staging apparatus.

The present invention may be embodied in other specific forms without departing from its spirit or essential characteristics. The described embodiments are to be considered in all respects only as illustrative and not restrictive. The scope of the invention is, therefore, indicated by the appended claims rather than by the forgoing description. All changes which come within the meaning and range of equivalency of the claims are to be embraced within their scope.

What is claimed and desired to be secured by United States Letters Patent is:

1. A system for verifying the authenticity of an object, comprising:

(a) at least one light source configured to direct an incident light beam toward an object to be authenticated;

(b) at least one optical detector configured to receive the light beam directed along a first optical path from the object where a color shifting optical interference security feature should be located, the optical detector adapted to measure the light beam over a range of spectral wavelengths to generate a spectral curve corresponding to the reflectance or transmittance spectra of the security feature; and (c) a data analyzing device operatively connected to the optical detector and adapted to analyze the spectral curve generated by the optical detector to verify the authenticity of the object.

2. The system of claim 1, wherein the light source generates a broadband light beam.

3. The system of claim 1, further comprising a transport staging apparatus configured to position the object such that the incident light beam strikes a portion of the object where the color shifting optical interference security feature should be located.

4. The system of claim 3, wherein the transport staging apparatus is configured to pass a plurality of objects past the light source.

5. The system of claim 1, wherein the optical detector is selected from the group consisting of a spectrophotometer, a spectrograph, and combinations thereof.

6. The system of claim 1, wherein the optical detector comprises a linear variable filter mounted to a linear diode array.

7. A system for verifying the authenticity of an object, comprising:

(a) at least one light source configured to direct at least one light beam at a first incident angle toward an object to be authenticated;

(b) a transport staging apparatus adapted to position the object such that the at least one light beam is incident on a portion of the object where a color shifting optical interference security feature should be located; and (c) an analyzing apparatus adapted to analyze the electromagnetic spectrum of diffused light directed from the object to verify the authenticity of the object.

8. The system of claim 7, further comprising an additional light source configured to direct an additional light beam at a second incident angle toward the object to be authenticated.

9. The system of claim 7, wherein the analyzing apparatus comprises a diffuser and at least one image recording device in optical communication with the diffuser.

10. The system of claim 9, wherein the analyzing apparatus further includes a data analyzing device operatively coupled to the image recording device and adapted to analyze the backscatter pattern of light incident upon the diffuser.

11. The system of claim 9, wherein the diffuser comprises a planar diffuser.

12. The system of claim 9, wherein the diffuser comprises a domed diffuser.

13. The system of claim 7, wherein the analyzing apparatus comprises a diffuser and at least one detector array in optical communication with the diffuser.

14. The system of claim 7, wherein the analyzing apparatus is adapted to analyze the color spectrum of diffused light directed from the object.

15. A system for verifying the authenticity of an object, comprising:

(a) at least one light source configured to direct at least one light beam at a first incident angle toward an object to be authenticated;

(b) a light collector adapted to collect the light beam directed along a first optical path from the object where a color shifting optical interference security feature should be located; and (c) an analyzing apparatus operatively connected to the light collector and adapted to analyze the optical characteristics of the light beam directed from the object into the light collector to verify the authenticity of the object.

16. The system of claim 15, further comprising an additional light source configured to direct an additional light beam at a second incident angle toward the object to be authenticated.

17. The system of claim 15, further comprising a transport staging apparatus adapted to position the object such that the light beam is incident on a portion of the object where an optical interference security feature should be located.

18. The system of claim 15, wherein the analyzing apparatus comprises an optical detector and a data analyzing device.

19. The system of claim 15, wherein the light collector has a hollow interior.

20. The system of claim wherein the light collector has a tapered configuration.

21. A system for verifying the authenticity of an object, comprising:

(a) at least one light source configured to direct at least one light beam at a first incident angle toward an object to be authenticated;

(b) a transport staging apparatus adapted to position the object such that the at least one light beam is incident on a portion of the object where an optical interference security feature should be located; and (c) an analyzing apparatus adapted to analyze the electromagnetic spectrum of diffused light directed from the object to verify the authenticity of the object, the analyzing apparatus comprising a diffuser and at least one image recording device in optical communication with the diffuser.

22. The system of claim 21, wherein the analyzing apparatus further includes a data analyzing device operatively coupled to the image recording device and adapted to analyze the backscatter pattern of light incident upon the diffuser.

23. A system for verifying the authenticity of an object, comprising:

(a) at least on light source configured to direct at least one light beam at a first incident angle toward an object to be authenticated;

(b) a transport staging apparatus adapted to position the object such that the at least one light beam is incident on a portion of the object where an optical interference security feature should be located; and (c) an analyzing apparatus adapted to analyze the electromagnetic spectrum of diffused light directed from the object to verify the authenticity of the object, the analyzing apparatus comprising a diffuser and at least one detector array in optical communication with the diffuser.

* * * * *

UNITED STATES PATENT AND TRADEMARK OFFICE

CERTIFICATE OF CORRECTION

PATENT NO. : 6,473,165 B1
DATED : October 29, 2002
INVENTOR(S) : Coombs et al.

It is certified that error appears in the above-identified patent and that said Letters Patent is hereby corrected as shown below:

Title page,
Item [75], Inventors, after "Ken D. Cardell" change "Tucson, AZ" to -- Sebastopol, CA --
Item [56], References Cited, U.S. PATENT DOCUMENTS, after "4,922,109 A * 5/1990" change "Bercovtz" to -- Bercovitz --

Column 6,
Line 48, after "directly" change "effect" to -- affect --

Column 13,
Line 19, after "332" change "so along as" to -- so long as --
Line 32, after "reflected angles" change "$74_{2a}$" to -- $\theta_{2a}$ --
Line 56, before "optical path" insert -- associated --
Line 64, change "configuration" to -- configurations --

Column 14,
Line 20, change "spectral 21 22 shape" to -- spectral shape --

Column 25,
Line 3, change "claim" to -- claim 15, --

Signed and Sealed this

Sixth Day of May, 2003

JAMES E. ROGAN
*Director of the United States Patent and Trademark Office*